US012615168B2

(12) United States Patent
Yoo et al.

(10) Patent No.: US 12,615,168 B2
(45) Date of Patent: Apr. 28, 2026

(54) INFORMATION PROCESSING METHOD, PROCESSING SYSTEM, AND PROCESSING APPARATUS FOR A HOME APPLIANCE

(71) Applicant: LG ELECTRONICS INC., Seoul (KR)

(72) Inventors: Hyunsun Yoo, Seoul (KR); Minjeong Kang, Seoul (KR); Kyungin Oh, Seoul (KR); Sukhyun Lim, Seoul (KR); Hyeran Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 18/725,570

(22) PCT Filed: Sep. 7, 2023

(86) PCT No.: PCT/KR2023/013415
§ 371 (c)(1),
(2) Date: Jun. 28, 2024

(87) PCT Pub. No.: WO2024/080562
PCT Pub. Date: Apr. 18, 2024

(65) Prior Publication Data
US 2025/0158848 A1      May 15, 2025

(30) Foreign Application Priority Data
Oct. 11, 2022      (KR) ........................ 10-2022-0129580

(51) Int. Cl.
*H04L 12/28*      (2006.01)
(52) U.S. Cl.
CPC ...... *H04L 12/2818* (2013.01); *H04L 12/2823* (2013.01)

(58) Field of Classification Search
CPC ........................ H04L 12/2818; H04L 12/2823
See application file for complete search history.

(56) References Cited

U.S. PATENT DOCUMENTS

2017/0370741 A1* 12/2017 Swaminathan ......... H04W 4/40
2021/0266326 A1* 8/2021 Chen ....................... H04L 67/52
(Continued)

FOREIGN PATENT DOCUMENTS

KR      10-2009-0025059 A      3/2009
KR      10-2017-0019258 A      2/2017
(Continued)

OTHER PUBLICATIONS

Fan et al, "An Intelligence air-conditiong control system based on Mobile Communication Networks", Aug. 1, 2015.*
(Continued)

*Primary Examiner* — Todd L Barker
(74) *Attorney, Agent, or Firm* — Birch, Stewart, Kolasch & Birch, LLP

(57) ABSTRACT

An information processing system may include at least one home appliance, a terminal configured to process information of the at least one home appliance, an individual service area configured to provide an individual service, and an information processing apparatus connected to the terminal and the at least one home appliance through a network and configured to provide an application service using the individual service. The information processing apparatus may be configured to receive basic information on changes of a schedule of a user, confirm user's schedule information from the basic information by using the individual service, confirm a first state of the at least one home appliance, which is a current state of the at least one home appliance, and change the at least one home appliance from the first state into a second state in response to the user's schedule information.

17 Claims, 12 Drawing Sheets

(56)                    References Cited

U.S. PATENT DOCUMENTS

2022/0292482 A1* 9/2022 Hamdan .............. G06Q 20/409
2022/0294854 A1* 9/2022 Tikhomirov ............ H04L 67/34

FOREIGN PATENT DOCUMENTS

KR      10-2021-0023112 A      3/2021
KR      10-2021-0067785 A      6/2021
KR      10-2022-0007805 A      1/2022
KR      10-2022-0047078 A      4/2022

OTHER PUBLICATIONS

Tanyingyong et all, "IoT-Grid. IoT Communication for Smart DC
Grids" Dec. 1, 2016.*
Kaliszan et al., "Application of Real Time Operating System in the
Internet of Things", Sep. 21, 2016.*

* cited by examiner

FIG. 3

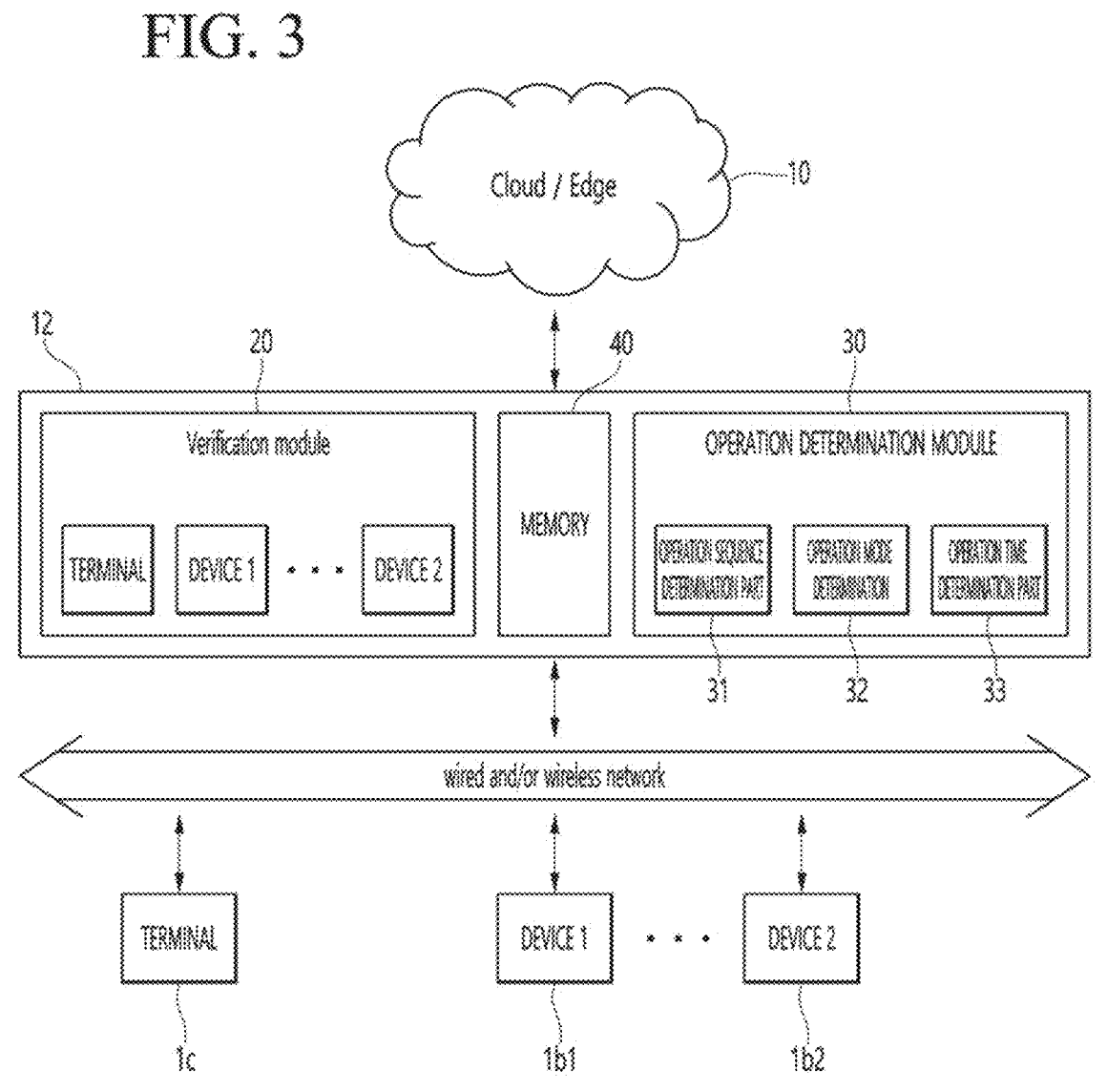

Cloud / Edge ~10

Verification module

| TERMINAL | DEVICE 1 | • • • | DEVICE 2 |

MEMORY

OPERATION DETERMINATION MODULE

| OPERATION SEQUENCE DETERMINATION PART | OPERATION MODE DETERMINATION | OPERATION TIME DETERMINATION PART |

31    32    33 wired and/or wireless network

TERMINAL

DEVICE 1   • • •   DEVICE 2

Figure 9:
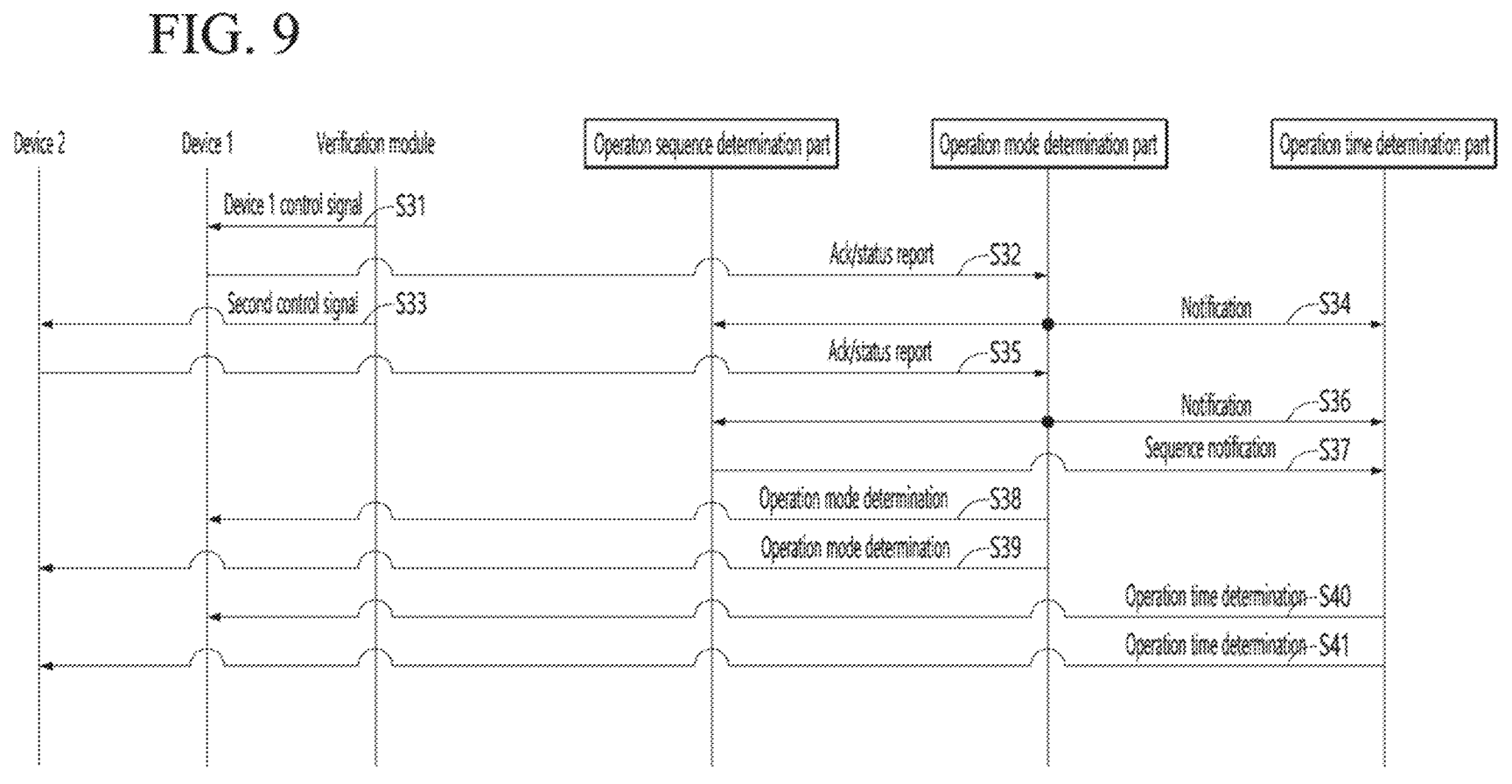

Operation time determination part

Operation mode determination part

Operation sequence determination part

Verification module

Device 1

Device 2

Device 1 control signal — S31

Adjust status report — S32

Second control signal — S33

Notification — S34

Adjust status report — S35

Notification — S36

Sequence notification — S37

Operation mode determination — S38

Operation mode determination — S39

Operation time determination — S40

Operation time determination — S41

Figure 11:
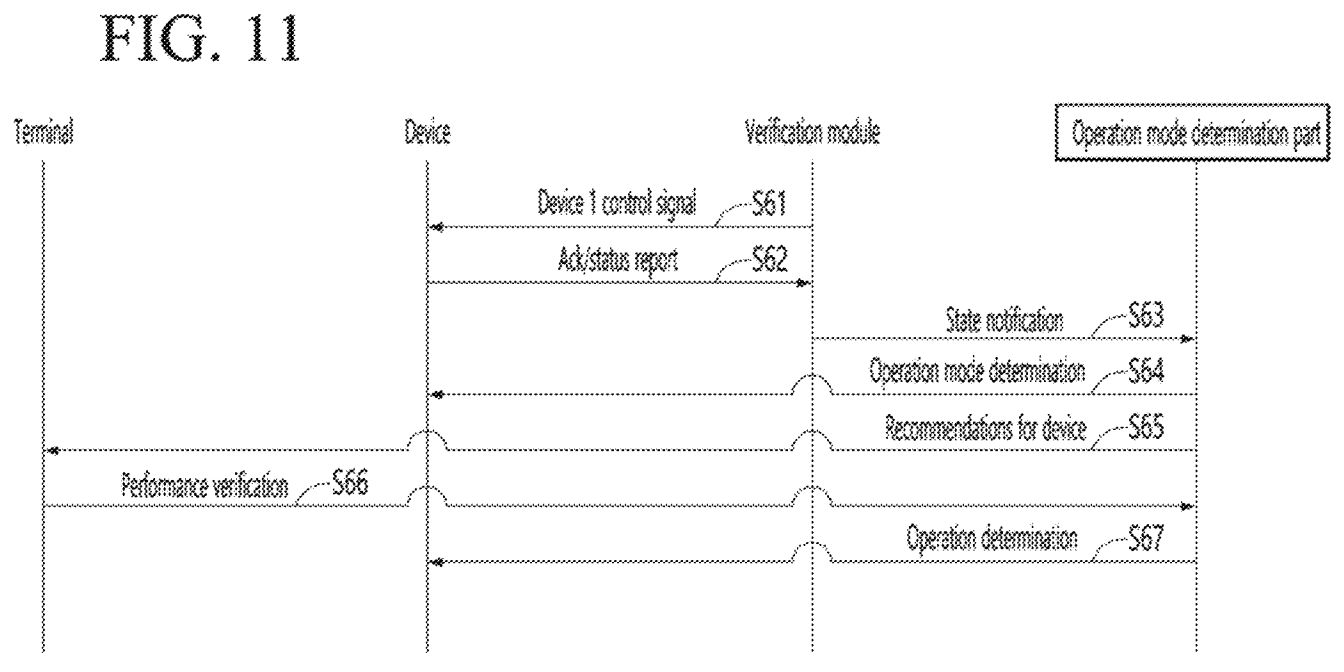

Operation mode determination part

Verification module

Device

Terminal

Device 1 control signal — S61

Ack/status report — S62

State notification — S63

Operation mode determination — S64

Recommendations for device — S65

Performance verification — S66

Operation determination — S67

INFORMATION PROCESSING METHOD, PROCESSING SYSTEM, AND PROCESSING APPARATUS FOR A HOME APPLIANCE

CROSS-REFERENCE TO RELATED APPLICATIONS

This application is a national stage filing of PCT App. No. PCT/KR2023/013415, filed on Sep. 7, 2023, which claims the priority benefit of Korean Patent Application No. 10-2022-0129580 filed in the Republic of Korea on Oct. 11, 2022, all of which are hereby incorporated by reference as if fully set forth herein.

TECHNICAL FIELD

The present invention relates to an information processing method for home appliances, an information processing system for home appliances, and an information processing apparatus for home appliances.

BACKGROUND ART

Home appliances mainly refer to devices installed in the user's home to help the user with housework. Home appliances may be fixed in the user's home to operate according to user's commands. The user may schedule and operate the home appliances. For example, if plaining to come back home at 5 o'clock, it makes a reservation in advance to allow an air conditioner to operate at 4:30 o'clock. According to this example, a user who return home may enjoy a clean indoor environment.

Home appliances may access the Internet through a wired or wireless communication network, such as Wi-Fi. The user may collect information about operations of the home appliances through the Internet. The user may transmit control commands to the home appliances through the Internet. As described above, various services are possible because the user and the home appliances in remote locations communicate with each other. For example, even if an operation of a home appliance has not been reserved, the home appliance may be reserved or operated in real time through the terminal. As a detailed example, even if you do not reserve the operation of the air conditioner when going to work, the user may operate the air conditioner in advance through the terminal when leaving work.

Due to the above technologies, the user may use the home appliances more conveniently. Although it was expected that these various home appliance reservation operations could greatly change the daily life, the reality is that the home appliances are not being utilized as much as expected. The inventor thought deeply about this problem and came up with the present invention.

The inventor found that even if the user made the reservation for the home appliance, there was a major problem that a time required for processing the home appliance of which the operation had finished could vary. For example, if laundry that has been washed through the reservation operation continues to be in a standby state, wrinkles in the laundry may become worse, or drying of the laundry may be delayed to cause a bad odor. As a result, it is problematic that the reservation operations lead to worse results. To solve this problem, techniques such as tumbling or spraying steam on dehydrated laundry cloth are introduced in a drum washing machine provided with a touch-up function and its touch-up method, which are disclosed in KR20090025059A. This problem may also occur if the user forgets to make the reservation for the home appliance.

The inventor found that there are many cases in which the operation of the reserved home appliance does not operate in a situation desired by the inventor. For example, it is assumed that the user sets a schedule for an air purifier to operate when an air quality is poor. Even though ventilation is beneficial, there may be a case in which the air purifier unnecessarily operates.

In many other cases, automatic operations of the home appliances may cause various problems such as excessive energy waste, unnecessary damage, and undesirable conditions.

DISCLOSURE OF THE INVENTION

Technical Problem

The present invention proposes an information processing method for a home appliance, an information processing system for a home appliance, and an information processing apparatus for a home appliance, which are capable of responding to a user's changeable schedule.

The present invention proposes an information processing method for a home appliance, an information processing system for a home appliance, and an information processing apparatus for a home appliance, in which an home appliance optimally operates even when a user in not aware of the home appliance.

The present invention proposes an information processing method for a home appliance, an information processing system for a home appliance, and an information processing apparatus for a home appliance, which a reservation operation of a home appliance is further activated.

The technical problems of the present invention are also proposed in the effects and embodiments of the invention.

Technical Solution

An information processing system for a home appliance according to the present invention may include: at least one home appliance; a terminal configured to process information of the at least one home appliance; an individual service area configured to provide an individual service; and an information processing apparatus connected to the terminal and the at least one home appliance through a network and configured to provide an application service using the individual service. The system may identify user needs for the individual service and provide a corresponding application service.

Optionally, the information processing apparatus may be configured to: receive basic information on changes of a schedule of a user using the at least one home appliance; and confirm user's schedule information from the basic information by using the individual service. Information related to the user's schedule information may be confirmed. The confirmed information may be used to control the home appliance.

Optionally, the information processing apparatus may be configured to: confirm a first state of the at least one home appliance, which is current information; and change the at least one home appliance from the first state into a second state in response to the schedule information. According to this system, a user may not need to know what state the home appliance is currently in. According to this system, the state of the home appliance may be changed to the state desired by the user without specific instructions from the user. The user may conveniently use the plurality of home appliances.

Optionally, the basic information may be input from the terminal. The user may conveniently transmit their own voice and text messages.

Optionally, the basic information may be information related to the user's delay in returning home. Optionally, the first state may be information on the currently reserved home appliance. Optionally, the second state may be reservation information for the home appliance to be changed in response to the schedule information. Accordingly, when the user's return home is delayed, a usage state of at least one home appliance may be collectively changed to the user's desired state. Accordingly, the satisfaction of the user may be enhanced.

Optionally, the information processing apparatus may transmit the schedule information to the terminal. Before controlling the home appliance, the user may confirm that his or her basic information has been identified by the individual service.

Optionally, in the information processing apparatus, at least one of the first state or the second state of the at least one home appliance may be transmitted to the terminal. This may have an effect of improving the user convenience.

An information processing system for a home appliance according to the present invention may include: a confirmation module configured to check an operation state of at least one home appliance in response to a node request; and an operation determination module configured to change the operation state of the at least one home appliance from a first state to a second state when there is a trigger signal containing the user's schedule information. According to the present invention, the state of the home appliance may be conveniently changed at once to the user's desired state.

Optionally, the operation determination module may include an operation sequence determination part, wherein the operation sequence determination part may be configured to determine that a first home appliance of the at least one home appliance operates before a second home appliance of the at least one home appliance. According to the present invention, an operation sequence of two or more home appliances may be changed in response to the user's schedule information. As a result, the user convenience may be improved. The present invention has an advantage of being able to operate at least two home appliances in the state desired by the user even without user instructions.

Optionally, the operation determination module may include an operation mode determination part, wherein the operation mode determination part may be configured to determine an operation in a delay mode in which the operation of the at least one home appliance is delayed. According to the present invention, the user convenience may be improved. The present invention has an advantage of being able to operate the home appliance in the state desired by the user even without user instructions.

Optionally, the operation determination module may include an operation time determination part, wherein the operation time determination part may be configured to change an operation time of the at least one home appliance. According to the present invention, the user convenience may be improved. The present invention has an advantage of being able to operate at least two home appliances in the state desired by the user even without user instructions.

An information processing method for a home appliance according to the present invention may include: receiving a trigger signal from a node through an information processing apparatus; understanding meaning of the trigger signal by using an individual service; identify a first state of at least one home appliance through the information processing apparatus; and performing an application service that changes the state of the at least one home appliance from the first state to a second state in response to the meaning of the trigger signal. According to the present invention, the home appliance may be conveniently used by using a simple trigger signal presented by the user (here, the trigger signal is information such as voice or text that the user uses to express his/her intention in daily social life).

Optionally, the information processing apparatus may be configured to notify the meaning of the trigger signal to the terminal as a first result reply. The user may conveniently confirm the analysis results of the trigger signal.

Optionally, the information processing apparatus may be configured to notify the first state of the home appliance to the terminal as a second result replay. The user may confirm the current state of the home appliance by confirming the first state of the home appliance.

Optionally, the information processing apparatus may be configured to notify the second state of the home appliance to the terminal as a third result replay. The user may confirm that the home appliance operates in response to the trigger signal, whether the user wants it or not.

Optionally, the trigger signal may be a change in user's schedule using the home appliance. Optionally, the first state may be a current state of the at least one home appliance. Optionally, the second state may be a change in operation state of the home appliance in response to the change in the user's schedule. Accordingly, the satisfaction of the user may be enhanced.

Optionally, the schedule change may be that the user's return hole is delayed. Optionally, the second state may be that that at least one home appliance operates with a delay. Accordingly, the satisfaction of the user may be enhanced.

Optionally, in the application service that changes the state of the at least one home appliance from the first state to the second state, the second state may include determining that an operation of a first home appliance of the at least one home appliance is performed priors to an operation of a second home appliance of the at least one home appliance. Accordingly, the user may confirm that the home appliance operates in response to the trigger signal, whether the user wants it or not.

Optionally, the first home appliance may be a robot vacuum cleaner, and the second home appliance may be an air purifier. Accordingly, the indoor environment may be optimally provided.

Optionally, the first state may be a state in which operation reservation is set. The reservation settings may be automatically changed, and thus, the user may conveniently use the home appliance.

Optionally, in the application service that changes the state of the at least one home appliance from the first state to the second state, the first state may be a state in which operation reservation is not set, and the second state may be changed to reservation state. Accordingly, even if the reservation is not made because the user does not want it, the home appliance may operate in response to the trigger signal. Here, the home appliance that is changed from the first state to the second state may include a ventilation device. Accordingly, the user's indoor environment may be kept cleaner.

Optionally, the meaning of the trigger signal may be a delay in returning home. The at least one home appliance may be a washing machine. The first state may be a current state of the at least one home appliance. Here, when the first state is a reservation operation, an operation of the washing machine may be delayed in response to the delay in returning home. Accordingly, an operation of the washing machine may start at an appropriate time. Here, when the first state is a washing or rinsing operation, the second state may be a delayed operation of the washing machine. Accordingly, the laundry cloth may be cleanly maintained. Here, when the first state is dehydration, tumbling may be performed after the dehydration. Accordingly, wrinkles in laundry cloth may be prevented.

Optionally, in the application service that changes the state of the at least one home appliance from the first state to the second state, the first state may be a state in which an operation reservation is not set, and the information processing method may include recommending the at least one home appliance, for which the operation reservation is not set, as the terminal. Accordingly, the home appliances that the user does not want may be recommended as desirable home appliances. Here, the device that is subject to the recommendation may include a clothes care machine. Accordingly, the home appliances that do not damage clothes and are suitable for processing clothes may be recommended. The user may use the home appliances conveniently and reliably.

Advantageous Effects

According to the present invention, the user may change the reservation operation of the home appliance simply by notifying the information processing system of his or her schedule by the user. Accordingly, there may be the advantage in that the optimal operation of the home appliance is achieved on its own even when the user is not aware of the reservation operation.

According to the present invention, even if there is no scheduled operation of the home appliance, the home appliance may operate in the energy-saving environment according to the user's actual return home time.

According to the present invention, there may be the advantage that the user's life is enriched by artificial intelligence tasks that match the operation of the home appliance and the user's schedule.

According to the present invention, the reservation operation of the home appliance may be further activated to provide the advantage of making the user's life more convenient.

According to the present invention, at least two home appliances may perform the cooperative operation. Accordingly, the optimal indoor environment may be established.

BRIEF DESCRIPTION OF THE DRAWINGS

FIG. 3 is a view for explaining an information processing apparatus for a home appliance according to an embodiment.

FIG. 9 is a flowchart of the information processing method for the home appliance according to an embodiment.

FIG. 10 is a flowchart of the information processing method for the home appliance according to an embodiment.

FIG. 11 is a flowchart of the information processing method for the home appliance according to an embodiment.

MODE FOR CARRYING OUT THE INVENTION

Figure 1:
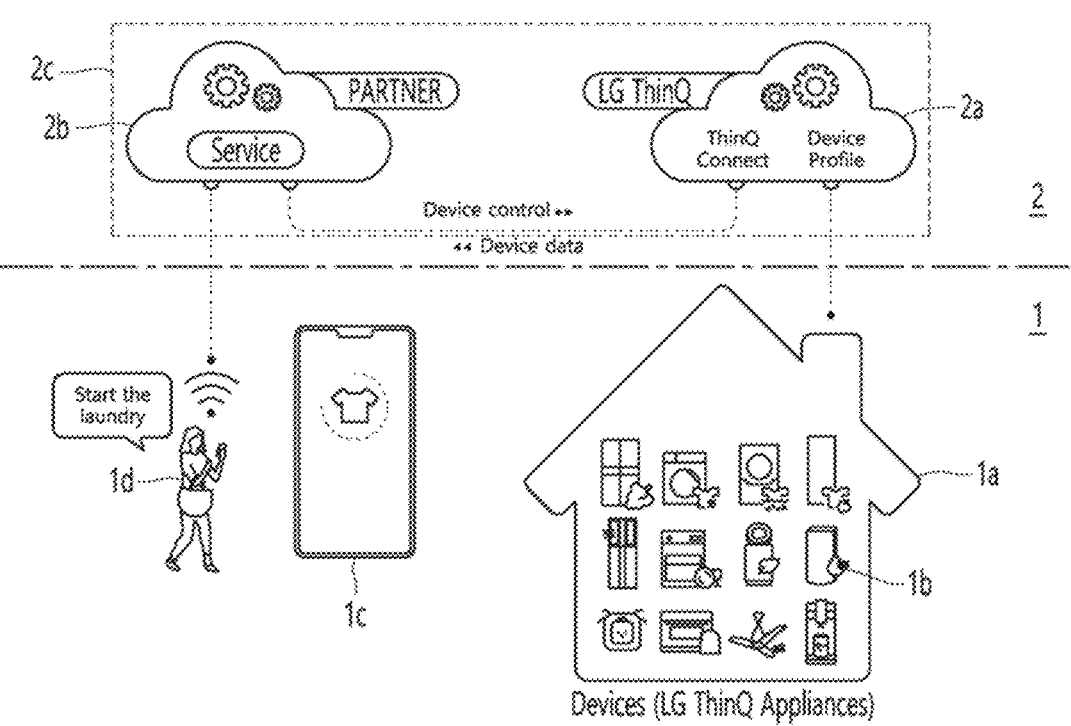
FIG. 1 is a view illustrating an information processing system for a home appliance according to an embodiment.

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

In this application, the information processing method, the information processing system, and the information processing apparatus examine the same inventive idea from different aspects. Any shortcomings in one embodiment may be supplemented by explanation of other embodiments. Any portion of one embodiment may be expanded or changed according to the description of other embodiments.

In the description of the drawings, identical or similar components are given the same reference numbers regardless of reference numerals, and duplicated descriptions thereof may be omitted.

The suffixes "module" and "unit" for components used in the description below are assigned or mixed in consideration of easiness in writing the specification and do not have distinctive meanings or roles by themselves.

In describing the embodiments disclosed in this application, detailed descriptions related to well-known functions or configurations will be ruled out in order not to unnecessarily obscure subject matters of the present invention.

However, this does not limit the present invention within specific embodiments and it should be understood that the present invention covers all the modifications, equivalents, and replacements within the idea and technical scope of the present invention.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless referred to the contrary.

In this application, the terms "comprises" or "having" are intended to indicate that there is a feature, number, step, operation, component, part, or combination thereof described in the specification, and one or more other features. It is to be understood that the present invention does not exclude the possibility of the presence or the addition of numbers, steps, operations, components, components, or a combination thereof.

In this application, home appliances may also include the same type of devices, but be used for commercial, public, and other purposes other than at home.

In this application, a service may include one or more processors that provide processing results for requests for a specific purpose. Here, the service may be an abbreviation for a service module. The service may include a processor programmed for processing of the device and method. Here, the processor may include hardware, software running on specific hardware, or software running on general-purpose hardware. The service may refer to certain data.

In the description of the method of the present application, even if the first process (e.g., S10) is performed before the second process (e.g., S2), the first process does not necessarily precede the second process. According to contents of the embodiment, the processes may be changed.

FIG. 1 is a view illustrating an information processing system for a home appliance according to an embodiment.

Referring to FIG. 1, an information processing system for a home appliance may include a user area 1 and an operator area 2. The user area 1 may be a dominant area for a user who use home appliances. The operator area 2 may be a control area of an operator who provides the home appliances, operates the system, or provides a services.

The user area 1 may include a building 1a. The home appliances 1b may be placed in the building 1a. The building 1a may be connected to any structure to which a network is connected. The home appliances 1b may include home appliances such as massagers, water purifiers, vacuum cleaners, clothes care machines, refrigerators, washing machines, air purifiers, cookers, and air conditioners. The home appliances are not limited thereto, and may include various devices such as automobiles, plant cultivators, and pumps. The user area 1 may include a terminal 1c. The user 1d may perform communication using the terminal 1c. The terminal 1c may be linked to any structure to which a network is connected. The terminal may be compatible with the home appliance. At least one terminal may be provided. The terminal may include at least two for direct or indirect interaction between the terminals.

The operator area 2 may include a server 2c. The server 2c may perform at least some functions of the information processing apparatus according to the present invention. The server 2c may be an operation server that operates the home appliance. In this case, the operation information of the home appliance may be obtained. The server 2c may be a communication server that communicates with the terminal. The server 2c may be a server of a manufacturer of the home appliance. The server 2c may be a server of an operator of the home appliance. In this case, management of the home appliance may be performed. For example, a quality control may be performed. The server 2c may include a first server 2a that communicates with the home appliance 1b. The server 2c may include a second server 2b that communicates with the terminal 1c. The first and second servers 2a and 2b may communicate with each other. The first and second servers 2a and 2b may not be separated, but may be configured as a single device. The first and second servers 2a and 2b may be implemented by at least one cloud system.

The first server 2a may receive usage information including an operation state of the home appliance 1b. For example, usage information such as an operation time, an operation mode, and a failure state of the home appliance 1b may be received. The first server 2a may control an operation of the home appliance. The second server 2b may transmit the operation state of the home appliance 1b and necessary information to the terminal 1c. Here, the necessary information may include all pieces of information that are helpful to the user 1d in relation to the home appliance. The second server 2b may receive request information from the terminal 1c. Here, the request information may be control information of the home appliance 1b, which is desired by the user.

The first server 2a may transmit the state information of the home appliance 1b to the second server 2b. The second server 2b may transmit the control information of the home appliance 1b to the first server 2a. The second server 2a may provide services to the user. Here, the service may include the operating of the home appliance in response to the user's needs.

The interaction between the server 2c, the home appliance 1b, the terminal 1c, and the user 1d will be briefly described.

The server may manage all of the home appliances that are the target of the service in order to perform the service. The home appliance may be connected to the server through the communication to execute commands transmitted from the server. The server may receive service request. The service request may be received by the server through the home appliance. The terminal may apply for the service request. The terminal may refer to devices having a communication module, such as mobile phones, smartphones, laptops, and computers. The terminal may communicate directly with the server. The server may communicate with the home appliance.

The home appliance may have a unique device ID. The ID may be registered and managed on the server. When the home appliance accesses the server, the server may specify the home appliance through the device ID. The server may manage characteristic information of the home appliance together with the device ID.

The home appliance may be fixed within the building. Stable communication with the server may be possible through an AP within the building. The terminal may communicate indirectly with the home appliance through the server.

The user may request and receive the service for the home appliance registered on the server through the home appliance. However, it may not be easy to request the service from the server through the home appliance. In this case, the service may be requested from the server through a device carried by the user such as the terminal. For this, an application program capable of implementing the service may be installed in the terminal.

The user may request service by accessing the server and inputting the unique device ID of the home appliance which wishes to receive the service. The user may be given a user ID and password. The user may log in to a site operating by the server and register all of own home appliances. The home appliances registered to the server may be registered to the server together with the corresponding user ID. This may be done by transmitting the user ID and the unique device ID of the home appliance matched with the user ID to the server through the site. The server may store user information related to the user and home appliance information related to the home appliance through the processes. The user information and the home appliance information may be matched and be stored on the server.

The user may register as a member of the site through an application installed on the terminal and be given a user ID and password. The user may recognize the application as an applicant's ThinQ app. The user may register all of their home appliances with the above application. The application may be provided for a remote service of at least one home appliance.

The user may request the service through the terminal and easily obtain information such as service performance and completion. The service processing process may include receiving the service request to the server through at least one of the site, the terminal, and the home appliance, processing the service request by the server, and executing a command for the corresponding service according to a processing code.

Figure 2:
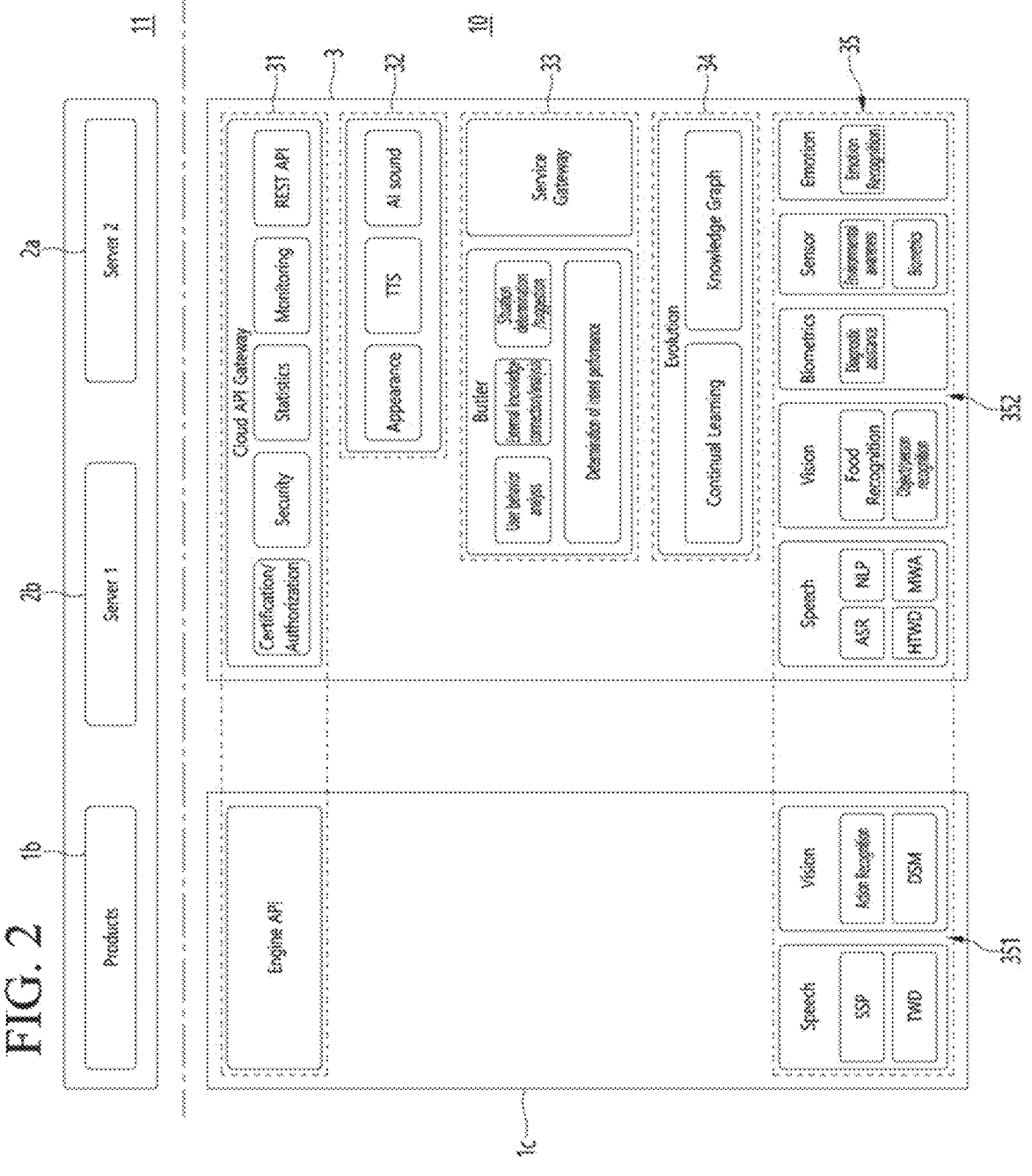
FIG. 2 is a view illustrating a configuration of the information processing system for the home appliance, which shows a cloud system in more detail.

FIG. 2 is a view illustrating a configuration of the information processing system for the home appliance, which shows a cloud system in more detail.

Referring to FIG. 2, the information processing system according to the embodiment may be divided into an individual service area 10 and an application service area 11. In the individual service area 10, basic information for operating an information processing method, an information processing apparatus, and an information processing system according to an embodiment may be processed. The basic information may be first information for requesting an application service. For example, it may be a user's voice saying that he or she will be late returning home. The voice may be basic information, and a service of the individual service area 10 may understand meaning of the voice.

The individual service area 10 may include at least one processor for an individual service. The application service area 11 may provide an application service to the user by applying the individual service supplied from the individual service area 10. The application service area 10 may include one or more processors for the application service. The processor may include hardware and software running on the hardware. The servers 2a and 2b may be implemented on a cloud system 3. The servers 2a and 2b may be implemented as one component of the cloud system, but for ease of understanding and differences in operation, the servers 2a and 2b may be displayed separately as illustrated in the drawing.

In the application service area 11, the home appliance 1b and the server 2c may be placed. The home appliance may include a plurality of devices already described. The server may communicate with the home appliance. The application service provided in the application service area may include a service directly requested by the user, a service indirectly requested by the user, a service that is considered requested by the user, and a service that is assumed to have been requested by the user. The application service may be determined by the server. The server may control the home appliance. The server may receive information about the home appliance. The server may communicate with the user through the terminal or home appliance.

The individual service area 10 may include a cloud system 3 and an edge device. The edge device may be a user's terminal 1c as an example. Here, the terminal may mean at least two terminals beyond a terminal of a single individual. The cloud system 3 may have large capacity and high-speed information processing capabilities. The cloud system may perform a heavy individual service 352 that requires a lot of resources to operate the service. The edge device may have small capacity and low-speed information processing capabilities. The edge device may provide a lightweight individual service 351 that requires a high-speed operation rather than accuracy.

The server 2c may initiate service in response to any one of several requests such as a request from the terminal 1c, a request from the home appliance 1b, and fulfillment of preset requirements.

If there is a request for the service, the server 2c may perform information processing corresponding to the requested service. The information processing may be performed by referring to information previously stored in a memory 40. The server may call at least one service of the individual service area 10 to perform the requested service. The server may use a combination of two or more services of the individual service area. The server may use the edge device for the individual service that requires rapid performance. The server may use the cloud system 3 for the individual service that requires accurate performance.

The performance result of the requested service may be in various forms, such as reporting to the user, controlling of the home appliance, and information storage. The performance result of the requested service may correspond to the requested service.

The performance process and result of the requested service may be notified to the terminal 1c and the home appliance 1b.

The plurality of individual services may be provided in the cloud system. The individual service may be performed by various service nodes such as virtual/physical machines, virtual/physical boxes, virtual/physical switches, and clusters in the cloud.

The individual service area may include an external management service 31 that manages the cloud and edge devices. The management service may include an interface. The management service may be provided to the cloud and edge devices. The individual service area may include an expression service 32 that provides a method of increasing in recognition corresponding to the user. The individual service area may include a butler service 33 that identifies the user's needs. The individual service area may include an awareness enhancement service 34 to improve performance of the butler service and the service. The individual service area may provide a recognition service 35.

Each of the above individual services will be described in more detail. The individual service may include various services that are presented below.

The management service 31 may include an application programming interface (API). The API may be a connection between computers or computer programs. The API may be a type of software interface and may provide the service to other types of software. The API may be applied to the edge device.

The management service 31 may include an API gateway. The API gateway may be a traffic manager that connects to an actual backend service or data and protects sensitive data by applying policies, authentication, and general access controls to API calls. The API gateway may perform authentication/authorization, security, statistics, and monitoring. A REST API may be an API that adheres to design principles of an REpresentational state transfer (REST) architectural style. The REST API may be said to comply with several principles applied in the cloud service.

The expression service 32 may include text-to-speech (TTS), i.e., voice synthesis. The TTS is a technology in which a machine automatically generates sound waves of speech sounds. For example, the TTS is a technology in which speech sounds of a person selected as a model are recorded, divided into certain speech units, and then coded and input into a speech synthesizer (speech computer, speech synthesizer). Then, only the necessary speech units are recombined according to instructions to create speed sounds artificially. The TTS may have various implementation methods.

The expression service 32 may include an AI sound. The AI sound refers to a technology that uses artificial intelligence (AI) to listen to sound and recognize a situation. For example, a scream or a sudden stop of a vehicle may be determined by listening to the sound.

The expression service 32 may include an appearance technology. An example of the facial expression technology is a technology that estimates feelings by looking at a face.

The butler service 33 may receive text, image information, sensor information, and situation information, which are the results of recognizing the user's voice input, as input data to determine the information based on a user's profile, context, and knowledge, thereby providing natural control and response. The butler service may use the recognition technology to analyze data received as input. The butler service may be linked to external services by determining the information as a knowledge base built on a knowledge management system (KMS). The butler service 33 may include user behavior analysis, external knowledge connection, external knowledge analysis, situation determination and response proposal, and intention execution determination.

The butler service 33 may provide control and response tailored to the conversation context and user situation by utilizing functions of the independently existing AI module. The user may feel customized services for themselves through the butler service 33.

The butler service 33 may include a service gateway that may access the external knowledge. The service gateway is a gateway for accessing the external services. The gateway may refer to a computer or software that enables communication between networks using different communication networks and protocols in the computer network. For example, the gateway may be a network point that acts as an entrance from one network to another network.

The recognition enhancement service 34 may include a learning processor. The cognitive enhancement service 34 may include continuous learning. The continuous learning is a method of upgrading one model little by little to enable to handle multiple tasks. In other words, the continuous learning is a method of improving model performance by continuously learning new data/tasks each time new learning is done, without forgetting previously learned data.

The recognition enhancement service 34 may include a knowledge graph. The knowledge graph may refer to a collection of interconnected descriptions of entities such as individuals, events, or concepts. The knowledge graph may store linking and semantic metadata within the context. This approach may provide a framework for data integration, unification, analysis, and sharing.

The recognition service 35 may include a speech service. The speech module may include various processors. The speech module may be used most accurately and conveniently by a remote user. The speech module has developed significantly compared to other modules.

The speech service may include a speech signal processing (SSP) service. The voice signal processing service is a function for applications such as voice communication and voice recognition. The sound source input to a microphone is of poor quality because of containing various noises from the surrounding area. Since low-quality sound sources are not used as is in voice calls or voice recognition programs, an SSP engine may be used to remove the noise and improve the quality of the sound source.

The speech may include a voice recognition (ASR: automatic speech recognition) service. The voice recognition service may provide a service that receives the user's voice data and converts the voice into text. The sound 'returning home' may be changed to the word 'returning home'.

The speech may include a natural language processing (NLP) service. The natural language processing service may mean converting natural language, which is human language, into a semantic structure that machines may understand. The word 'returning home' may mean understanding the word as returning home.

The speech may include a hybrid trigger word detection (HTWD) service. The HTWD service may include firstly performing embedded-based startup word detection and secondly performing server-based startup word detection to minimize misrecognition of startup words.

The speech may include a trigger word detection (TWD) service. The TWD service may construct speech data sets and implement algorithms for trigger word detection (also known as keyword detection or wake word detection). The trigger word detection may allow devices such as Amazon Alexa, Google Home, Apple Siri, and Baidu DuerOS to hear a specific word and trigger the device to wake up. The TWD may mean performing maneuver word detection with a small capacity engine. For example, when the user says, 'It's late to get home late,' the word 'returning home' may be searched as the trigger word.

The speech may include a multi-device wakeup arbitration (MWA) service. The MWA service may be a service that selects the most appropriate device for the user when multiple devices recognize the same startup word at the same time. The MWA service measures the user's direction, distance, etc., selects the device that may best recognize the user's voice commands, and provides feedback to the user. For example, when the startup word is recognized for an air conditioner, a television, and an oven at the same time, a service for selecting a suitable device may be provided.

In the speech services, the speech signal processing (SSP) service and the trigger word detection (TWD) service may be included in the edge device 1c. Because the two services are lightweight, the services may fully run on the edge device's capacity. This is because the above two services are conveniently used for the purpose of the edge device.

The recognition service 35 may express a vision service. The vision service may include various sub-services. The vision service may correspond to services that a user may perceive with his/him eyes.

The vision service may include a food recognition service. The food recognition service may recognize a location of food stored in the refrigerator. For example, using an image of an egg, the user may photograph the egg and find out the location of the egg from the photographed image. The food recognition service may recognize food in various manners such as shape and barcode. The recognized foods may be managed on the server.

The vision service may include an object/person recognition service. The person/object recognition service may distinguish a target person/object using a two-dimensional and three-dimensional shape of an object. The classified information may be used for various purposes such as identification, movement, and recognition.

The vision service may include a driver state monitoring (DSM) service. The driver state detection service may detect the user's face from video image data, track gaze, and track eye closure and eye blinking to provide a location of the face, a head direction, facial feature points, gaze direction and angle, and a degree of eye closure. The driver state detection service may detect driver's drowsiness and issue a warning.

The vision service may include a behavior recognition service. The behavior recognition service may be a service that recognizes the user's behavior as an activation signal. For example, the behavior recognition service may be a service that starts the terminal by the user shaking the terminal. The DSM service and behavior recognition service may be implemented in the edge device.

The recognition service 35 may include a biometric service. The biometric service may be an example of any service that determines user's health information. For example, a diagnostic assistance service may be performed using heart rate, information, and sleep information transmitted using a smartwatch.

The recognition service 35 may include a sensor service. The sensor service may perform services such as recognizing environments and biometrics through the transmitted information.

The recognition service 35 may include an emotion service. The emotion service may include an emotion recognition (ER) service. The emotion recognition service is a service that recognizes emotions from the user's facial expression, voice, or text entered by the user. The ER services that recognize emotions enable natural verbal and non-verbal communication between the user and the machine to help the people and machines to communicate and interact smoothly with each other.

In the individual service area 10, various other services such as gait tracking and behavior prediction may be applied. Each of the service in the individual service area 10 may provide other services by linking one service with another service. The services of the edge device 1*c* may be equipped with services that require speed. The services of the individual service area 10 may be linked to other external networks.

The cloud system may be equipped with services that require accuracy and complexity. The edge device and the cloud system may cooperate with each other. For example, after starting up with the word recognized in the TWD of the edge device 1*c*, the cloud system 3 may accurately determine using the HTWD. As another example, the behavior recognition recognized in the vision service of the edge device 1*c* may be used as information for other purposes in the object/person recognition service of the cloud system 3.

Each service in the individual service area 10 may operate as a learning model of artificial intelligence. The recognition enhancement service 34 may be constructed as the learning model. For example, at least one of the expression service 32, the butler service 33, the recognition enhancement service 34, and the recognition service 35 may be provided as a learning model using artificial intelligence. Each service in the individual service area 10 may be implemented as a table or an operation formula constructed as a mathematical formula. Each service in the individual service area may contain a mixture of the learning model and calculation formulas using the artificial intelligence.

Each service in the individual service area 10, i.e., the service module may return the processing result of the service request to the application service area.

In all of the following embodiments, there may be no specific mention of the service module of the individual service area called by the application service area. In this case, all the individual service modules, which are capable of replying, may reply to the service request, corresponding to the nature of the call by the application service in the application service area. There may be specific reference to the service module of the individual service area called by the application service area. In this case, an example is described, and it does not exclude that service modules in other individual service areas reply.

FIG. 3 is a view for explaining an information processing apparatus for the home appliance according to an embodiment.

Referring to FIG. 3, the information processing apparatus 12 according to an embodiment may include a confirmation module 20 that confirms a status of each node, a memory 40 that stores information necessary for information processing, and an operation determination module 30 that determines an operation of each node in response to a situation confirmed by the confirmation module. The node may include a home appliance and a terminal. The nodes do not exclude a terminal, a cloud system, and an edge device. A flow of information between the confirmation module, the memory, and the operation determination module may be performed by an internal bus. The confirmation module, the memory, and the operation determination module may share information with each other.

The information processing apparatus 12 may use an individual service of the individual service area 10. The information processing apparatus 12 may provide an application service. The information processing apparatus 12 may be a main processor that provides the application service. The information processing apparatus 12 may include a separate processor that provides the application service. The information processing apparatus 12 may be connected to the terminal 1*c* and the home appliances 1*b*1 and 1*b*2 through a wired or wireless network. The information processing apparatus 12 may be implemented by the server 2*c*.

The information processing apparatus 12 may start an operation by a trigger signal. The trigger signal may mean a starting signal. The trigger signal may be basic information. The basic information may be a simple signal that is not interpreted in itself. The trigger signal may be a direct or indirect signal from the user. For example, the trigger signal may be a user's voice message. In this case, the meaning may be understood after the voice message is processed into natural language. The individual service used at this time may be the natural language processing service described above.

The trigger signal may be a direct or indirect signal generated from each node connected to the home appliance. The trigger signal may be the fulfillment of a reserved condition. For example, when waking up in the morning is scheduled for 6 o'clock, it may be a signal from the clock that has reached 6 o'clock. As another example, it may be a user detection signal when automatically detecting the user.

The information processing apparatus 12 may request an individual service from the individual service area using the basic information. Here, the individual service may include understanding the meaning of the trigger signal, which is the basic information. Here, a speech service of the recognition service 35 may be used as the individual service. In the case of fulfillment of the reserved condition, the meaning has already been interpreted, and thus, understanding of the meaning may not be necessary even though it is the trigger signal.

The confirmation module 20 may receive the trigger signal. The confirmation module 20 may confirm each node in response to the trigger signal. The operating state of the home appliance may be known in response to the confirmation module 20. The application service may include confirming the operation state of the home appliance. The above home appliance may be used by multiple people. The home appliance may have a reservation operation scheduled in advance. For example, the confirmation module may determine information such as whether the home appliance is currently operating, waiting for operation, whether the operation has ended, and what specific contents of the operation standby state are. The information identified by the confirmation module 20 may be stored in the confirmation module for each home appliance.

With reference to the information identified by the confirmation module 20, the operation determination module 30 may determine the operation of the home appliance. The application service may include determining the operation of the home appliance. The operation determination module may determine an operation in response to the trigger signal. The operation determination module may determine an operation corresponding to the user's service request.

The operation determination module may include an operation sequence determination part 31. The operation sequence determination part 31 may determine an operation sequence of at least two home appliances that interoperate with each other. Here, the operation sequence may be different from the operation sequence of the home appliance confirmed by the confirmation module. The operation determination module may include an operation mode determination part 31. The operation mode determination part 31 may determine an operation mode of at least one home appliance. Here, the operation mode may be different from the operation mode of the home appliance confirmed by the confirmation module. The operation determination module may include an operation time determination part 33. The operation time determination part 33 may determine an operation time of at least one home appliance. Here, the operation time may be different from the operation time of the home appliance confirmed by the confirmation module.

The operation determination module 30 may operate with artificial intelligence. The operation determination module 30 may operate using the individual service of the individual service area 10. For example, it may operate using the learning model of the recognition enhancement service 34.

Figure 4:
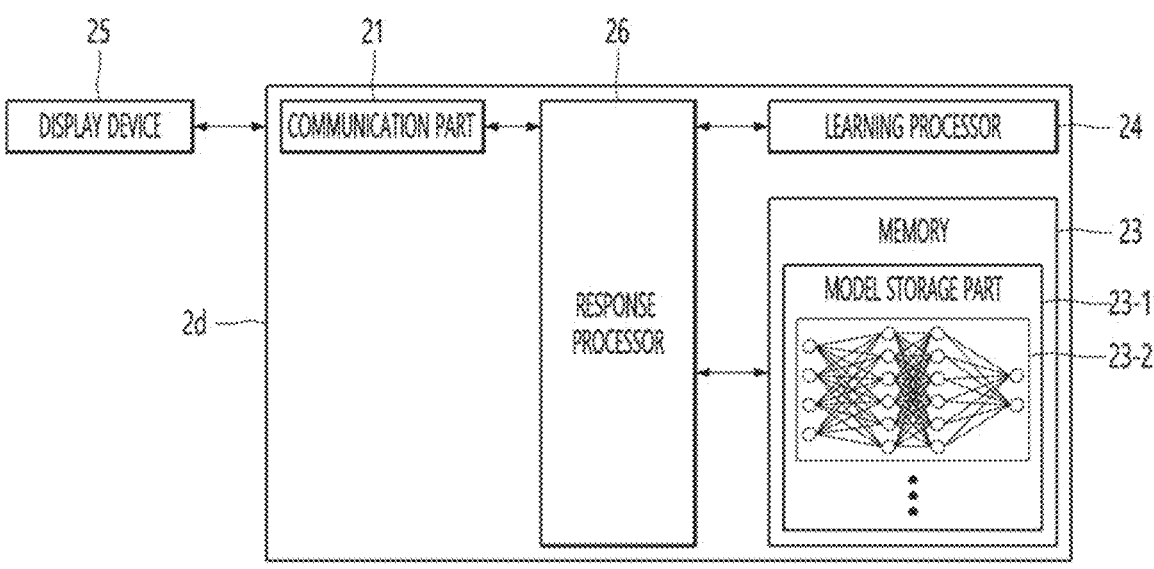
FIG. 4 is a view for explaining an example of providing a learning model.

FIG. 4 is a view for explaining an example of providing the learning model.

Referring to FIG. 4, an artificial intelligence (AI) server 2d may refer to a device that learns an artificial neural network by using a machine learning algorithm or uses a learned artificial neural network. The AI server 2d may include a plurality of servers to perform distributed processing, or may be defined as a 5G network. In this case, the AI server 2d may be included as a partial configuration of the display device 25, and may perform at least part of the AI processing together. The AI server 2d may be a portion of the server 2c.

The AI server 2d may include a communication part 21, a memory 23, a learning processor 24, and a response processor 26. The communication part 21 may transmit and receive data to and from an external device such as the display device 25.

The memory 23 may include a model storage part 23-1. The model storage part 23-1 may store a learning or learned model (or an artificial neural network 23-2) through the learning processor 24.

The learning processor 24 may learn the artificial neural network 23-2 by using the learning data. The learning model may be used in a state of being mounted on the AI server 2d of the artificial neural network, or may be used in a state of being mounted on an external device such as the display device 25.

The learning model may be implemented in hardware, software, or a combination of hardware and software. If all or part of the learning models are implemented in software, one or more instructions that constitute the learning model may be stored in memory 63.

The response processor 26 may infer the result value for new input data by using the learning model and may generate a response or a control command based on the inferred result value.

The learning model implemented by the AI server may be provided for each service provided in the individual service area. Each learning model may provide a response for each service. The operation determination module 30 may receive a response using each learning model.

Figure 5:
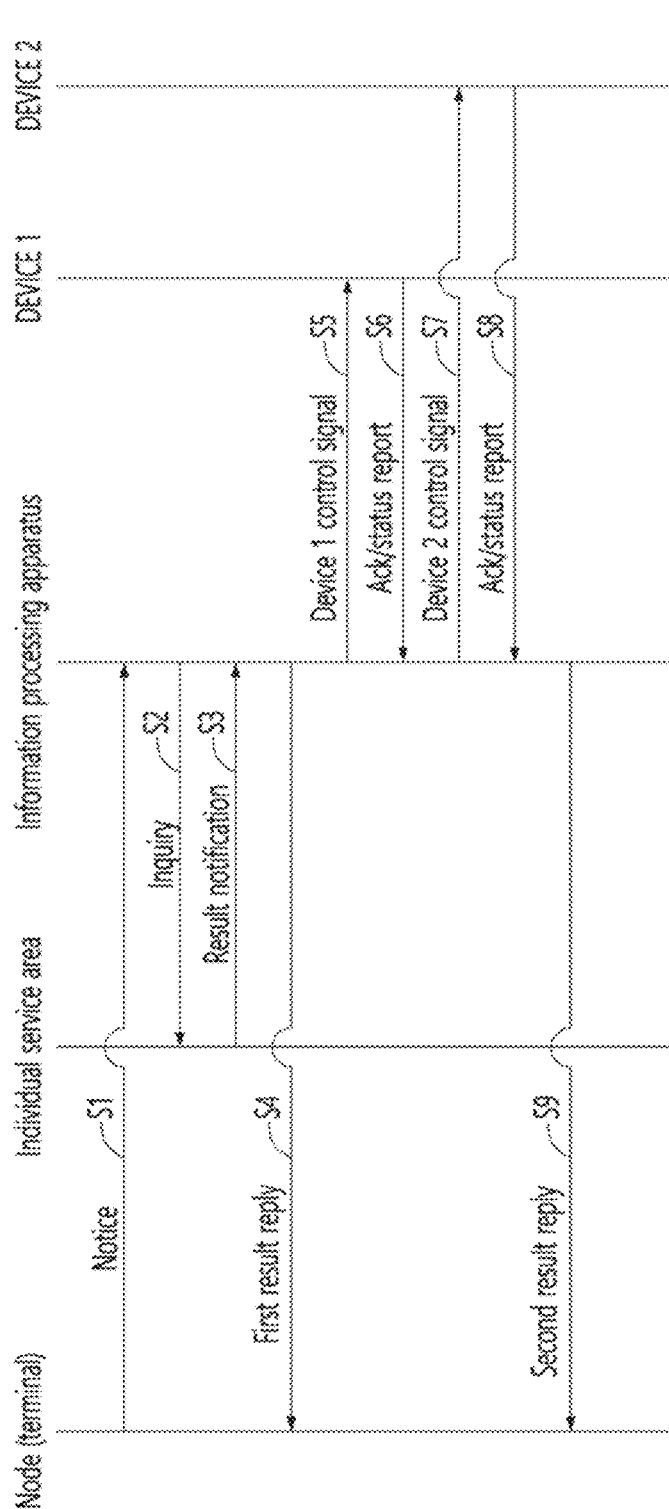
FIG. 5 is a view illustrating a flow of an information processing method according to an embodiment.

FIG. 5 is a view illustrating a flow of an information processing method according to an embodiment.

Referring to FIG. 5, the information processing apparatus 12 may receive the trigger signal from the node (S2). The node may be a terminal or a home appliance. The information processing apparatus may request an individual service from the individual service area (S2). Here, the individual service may include understanding the meaning of the trigger signal. For example, the speech service of the recognition service 35 may be used.

The individual service area may perform result notification as a result of responding to the request of the information processing apparatus (S3). The result notification may include at least one of the meaning of the trigger signal, a list of necessary operations corresponding to the trigger signal, or a list of operations required for the node.

The information processing apparatus may perform functions such as selecting a required operation of the home appliance in response to the trigger signal, and selecting an operation required by the user in response to the trigger signal. The information processing apparatus may provide an application service. The information processing apparatus may notify the node of the meaning of the trigger signal, the necessary operation corresponding to the trigger signal, the operation required from the node, and the confirmation result as a first result reply (S4).

The information processing apparatus may transmit a first control signal to the first home appliance (S5). The first home appliance may transmit an ack signal and a status report signal including the execution result of the first control signal (S6). The information processing apparatus may transmit a second control signal to the second home appliance (S7). The second home appliance may transmit an ack signal and a status report signal including the execution result of the second control signal (S8).

The information processing apparatus may notify the node of the performance results of the first and second home appliances as a second result reply to the node (S9). The node may include more home appliances in addition to the first and second home appliances. The node may include any one of the first and second home appliances. At least one process of the information processing method may be omitted in the information processing method according to another embodiment. At least one process of the information processing method according to another embodiment may be added to the information processing method.

An information processing method for the home appliance according to an embodiment will be described.

Figure 6:
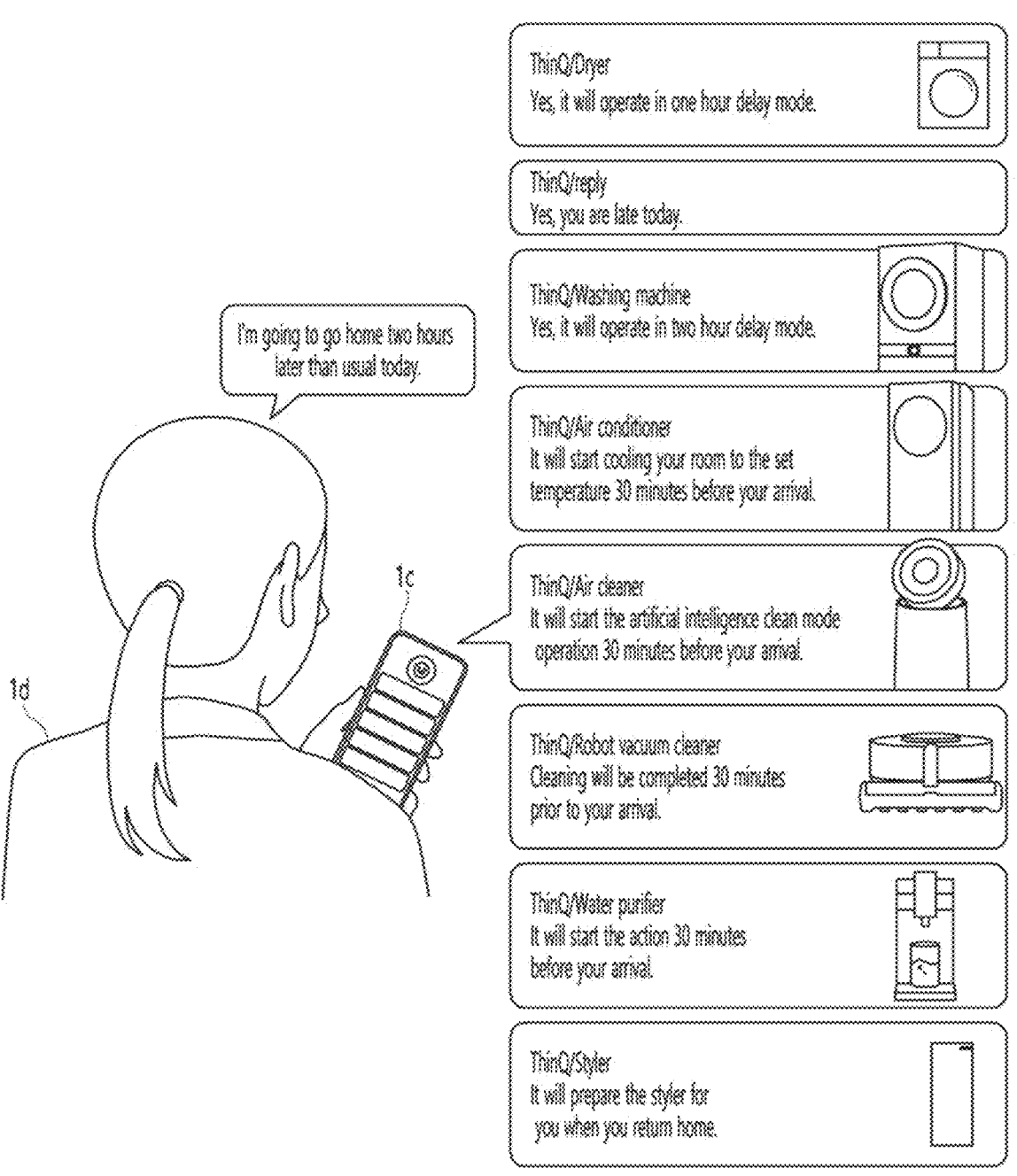
FIG. 6 is a view illustrating an interface in the information processing method according to an embodiment.

FIG. 6 is a view illustrating an interface in the information processing method according to an embodiment. Terms used in the interface in the drawings are directly quoted from the description of the embodiment for convenience of understanding. Other terms and methods with similar meaning may be used.

Referring to FIG. 6, a user 1*d* may use a terminal 1*c* to transmit that his/her return home time will be late. The trigger signal may be "I'm going to go to bed two hours later than usual today." The transmission method to the effect that the return home time will be delayed is exemplified by voice. In addition, it may be delivered to the information processing apparatus 10 in various manners such as text messages and agreed actions. This process may correspond to the notification process (S1) in FIG. 5. In the description of the embodiment, both the case in which the return home is delayed and the case in which the return home is accelerated may be included in the embodiment. This may be called a change in a return schedule. Other schedule changes may also be included. The same may apply below.

The user's message may be interpreted to mean that it will be late to return home. The effect of late return home may be interpreted by at least one service of the recognition service 35, the butler service 33, or the recognition enhancement service 34 provided as the service in the individual service area 10. The interpreted results may include the effect that the user's return home time is delayed and the operation that the home appliance should take in response to the user's late return home time. This process may correspond to an inquiry process (S2) and a result notification process (S3) in FIG. 5.

In response to the above interpreted results, a reply may be provided from the information processing apparatus to the terminal 1*c* in the form of "Yes, you are late today." The user 1*d* who received the reply may confirm that the information processing system has operated correctly. This process may correspond to the first result replay process (S4) of FIG. 5.

In response to the interpreted results, the information processing apparatus may determine the current state of the home appliance by transmitting the control signal to the device. The home appliance may transmit an ack/status report in response to the control signal. This process may correspond to the control signal and ack/status report (S5 to S8) of FIG. 5. If there is information that the user should pay attention to in the ack/status report (S6) (S8) of the home appliance, the second result reply process (S9) of FIG. 5 may be performed. For example, if there is no signal because the home appliance is not operating normally, the effect may be transmitted as a second result reply. The second result reply may be omitted.

In response to the interpreted results, the information processing apparatus may provide an application service. The information processing apparatus may determine a control signal for performing the application service. The information processing apparatus may transmit and control the control signal to the home appliance. In this case, it may be a case that the ack/status report (S6) (S8) of the home appliance has been performed normally. The application service may include at least one of an operation sequence, an operation mode, or an operation time of the home appliance.

In response to the analyzed result, the information processing apparatus may determine at least one of the operation sequence, the operation mode, or the operation time of at least one home appliance. The information processing apparatus may control the home appliance using at least one of the determined operation sequence, operation mode, or operation time. The information processing apparatus may notify the terminal 1*c* of the results of controlling the home appliance. This process may correspond to a third result replay process (S16) in FIG. 7.

An example of each reply in the third result reply process (S16) is presented. The information processing apparatus may reply to the terminal with "Yes, it will operate in a one-hour delay mode" regarding the dryer. Regarding the washing machine, the information processing apparatus may reply to the terminal with "Yes, it will operate in a two-hour delay mode." Regarding the air conditioner, the information processing apparatus may reply to the terminal with "It will start cooling comfortably at a set temperature 30 minutes before arrival." Regarding the air purifier, the information processing apparatus may reply to the terminal with "It will start operating an artificial intelligence purification mode 30 minutes before arrival." Regarding the robot vacuum cleaner, the information processing apparatus may reply to the terminal with "It will complete cleaning 30 minutes before arrival." Regarding the water purifier, the information processing apparatus may reply to the terminal with "It will complete cleaning 30 minutes before arrival." Regarding the clothes care machine, the information processing apparatus may reply to the terminal with "It will prepare a styler operation when returning to home."

The third result reply process may have more diverse cases depending on the information processing method of the home appliance. The user may know that the application service has been properly performed through the third result reply.

Hereinafter, various embodiments of information processing methods for the home appliance will be described.

Figure 7:
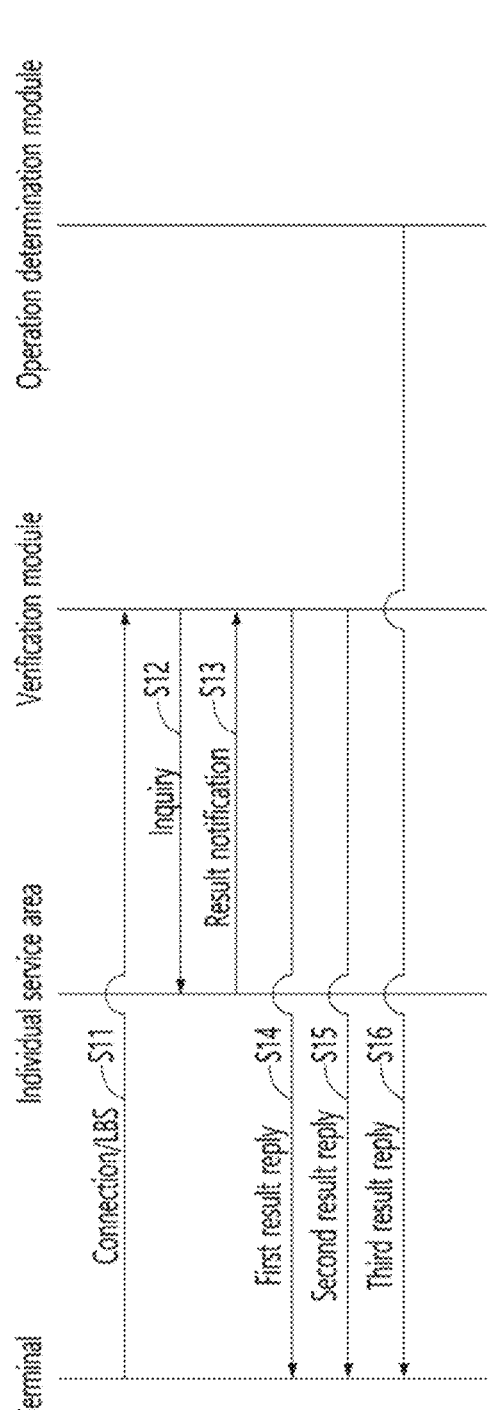
FIG. 7 is a flowchart of the information processing method for the home appliance according to an embodiment.

FIG. 7 is a flowchart of the information processing method for the home appliance according to an embodiment.

Referring to FIG. 7, the user 1*d* may transmit that his/her return home time will be late using the terminal 1*c*. When the terminal is connected to the company's network even though it is time to return home, or is located far from home using location-based services (LBS), etc., the terminal may notify the fact (S11). Here, the trigger signal may be location information of the terminal. The location information of the user terminal may be determined to indicate that the return home will be delayed.

The effect of late return home may be understood by at least one service of the recognition service 35, the butler service 33, or the recognition enhancement service 34 provided as the service in the individual service area 10. For example, there may be a learning model in which a recognition enhancement service 34 delays returning home by one hour if one is at work at the current time. Thereafter, an application service may be provided. For example, the interpreted results may include the effect that the user's return home time is delayed and the operation that the home appliance should take in response to the user's late return home time (S12) (S13).

In response to the interpreted result, the confirmation module 20 may perform a first result reply process (S14) to confirm to the user whether the delay is correct.

In response to the analyzed result, the confirmation module 20 may determine the current state of the home appliance by transmitting the control signal to the home appliance. The identified results may be delivered to the user as a second result including the state of the home appliance (S15).

In response to the analyzed result, the operation determination module 30 may determine at least one of the operation sequence, the operation mode, or the operation time of at least one home appliance. The information processing apparatus may control the home appliance using at least one of the determined operation sequence, operation mode, or operation time. The information processing apparatus may notify the terminal 1c of the control result of the home appliance as a third result (S16).

During the execution of the information processing method, the confirmation module and the operation determination module may use the individual service in the individual service area. The user may know the progress and results of the application service through the first, second, and third result replies.

Figure 8:
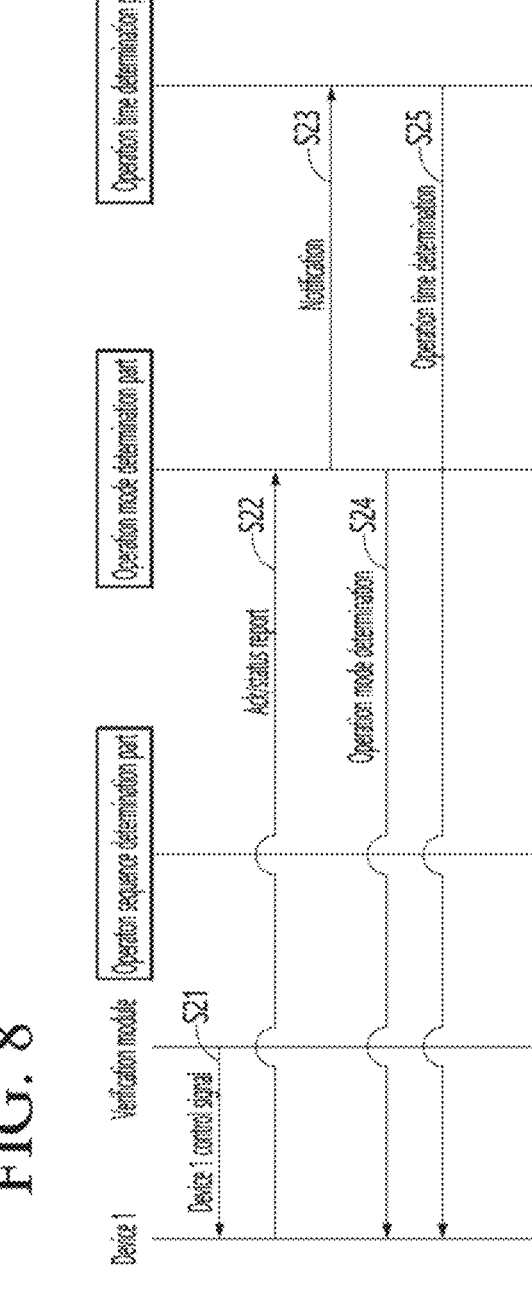
FIG. 8 is a flowchart of the information processing method for the home appliance according to an embodiment.

FIG. 8 is a flowchart of the information processing method for the home appliance according to an embodiment. This embodiment may be an embodiment after the purpose of delaying the user's return home is identified. For example, this may be an information processing method after the user's delayed return home is identified by the information processing method of FIG. 5.

Referring to FIG. 8, the confirmation module 20 may determine the current state of the home appliance 1b by transmitting the first control signal to the home appliance 1b (S21). The home appliance may transmit an ack message and a status report message (S22). The home appliance may transmit the ack message and the status report signal to at least one of the confirmation module 20 of the operation determination module 30. Through the bus inside the information processing apparatus, each module of the information processing apparatus may share information. The ack message may be transmitted to the confirmation module. The status report message may be transmitted to the operation determination module.

The operation mode determination part 32 may receive the status report message. The operation mode determination part may determine the operation mode of the home appliance by referring to the status report message. Depending on the type of the home appliance and/or the status report message, the operation mode of the home appliance may be determined differently.

The mode determined by the operation mode determination part 32 may be notified to the operation time determination part 33 (S23). The operation time determination part 33 may determine the operation time of the home appliance according to the determined mode and notify the determined operation time to the home appliance (S25). Likewise, the operation mode determination part 32 may notify the determined mode to the home appliance (S24).

The information processing method will be explained with an example.

In the case of a washing machine, the status report message may include whether the washing machine is running on schedule, which cycle it is in if the washing machine is running, whether the washing machine operation is scheduled and waiting to start, and whether there are no instruction from the washing machine. The status report message may be a response to the first control signal. Depending on the status report message, the washing machine's mode may be determined differently. The factors are because, if the washing machine is left for a long time after washing, wrinkles in the laundry are permanently maintained, and a bad smell is generated due to bacterial growth in the laundry. This is explained in more detail below.

First, when the washing machine is in operation, a current cycle of the washing machine is additionally determined. Thus, when a dehydration cycle is in progress, a tumbling mode in which the washing machine is periodically tumbled after the dehydration process is completed may be performed. Thus, it is possible to prevent the wrinkles in the laundry cloth and the generation of bad odors. Second, when the washing machine is in operation, the current cycle of the washing machine is additionally determined. Thus, when washing or rinsing is in progress, a delay mode in which the washing or rinsing is performed with a delay may be performed. As an example of the delay mode, a soaking operation may be performed by introducing a stop mode between the washing and rinsing. After the delay mode is ended, the tumbling mode may be performed. Third, when the operation is scheduled, and the washing machine is not yet in operation, the operation time of the washing machine may be redetermined by predicting the user's return time. For example, it is assumed that the scheduled laundry end time was 7 o'clock that is an end time of work. Here, if the scheduled return time is delayed to 8 o'clock, the scheduled laundry end time may move to 8 o'clock. This may be called a re-determination mode. After the operation according to the re-determination mode, the tumbling mode may be performed. Fourth, if there are no instruction from the washing machine, it may remain in this state.

The operation mode determination part 32 may notify the results according to the determined mode to the operation time determination part 33 and the operation sequence determination part 31 (S23). Since collaboration with other home appliances is not presented in this embodiment, the operation sequence determination part may not work. The operation time determination part 33 may reset the operation time of the washing machine according to the re-determination mode.

The operation mode determination part 32 and the operation time determination part 33 may transmit a newly determined operation mode and operation time of the washing machine to the device (S24) (S25). Matters decided afterward may be reported to the user through the third result reply.

According to the information processing method for the washing machine as described above, a new operation of the washing machine may be determined in response to the user's delay in returning home. As a result, the user may re-establish the operation of the washing machine simply by notifying the fact of the delay in returning home or automatically determining the delay in returning home. As a result, it has the effect of preventing the wrinkles and bad smells in the laundry cloth.

In the case of a water purifier, the status report message may be a scheduled operation to adjust a cold water temperature corresponding to the user's return home time. For example, when the user returns home at 7 o'clock, a cooling system may be turned off at 6 o'clock so that cold water is dispensed immediately. This may greatly increase in power saving effect.

In this case, the operation mode determination part 32 may move the operation time of the cooling system to 7 o'clock if the user's return home is delayed to 8 o'clock. This may be called a re-determination mode.

According to the information processing method for the water purifier described above, a new operation of the water purifier may be determined in response to the user's delay in returning home. As a result, the user may re-establish the operation of the water purifier simply by notifying the fact of the delay in returning home or automatically identifying the delay in returning home. As a result, it has the effect of preventing unnecessary waste of power.

In the case of an air conditioner, the status report message may be a scheduled operation that operates the air conditioner in advance in response to the user's return home time. For example, the cooling system may be turned on at 6:55 while the cooling system is turned off so that the user immediately feels coolness when he returns to home at 7 o'clock. This may maximize the power saving effect.

In this case, the operation mode determination part 32 may move the operation time of the cooling system from 7 o'clock to 55 minutes if the user's return home is delayed to 8 o'clock. This may be called a re-determination mode. After performing the re-determination mode, after the air conditioner reaches a desired temperature, a power saving operation may be performed by minimizing a frequency of the inverter.

According to the information processing method for the air conditioner described above, a new operation of the air conditioner may be determined in response to the user's delay in returning home. As a result, the user may re-establish the operation of the air conditioner simply by notifying the fact of the delay in returning home or automatically identifying the delay in returning home. As a result, it has the effect of preventing unnecessary waste of power.

According to this embodiment, the driving mode and driving time of the individual home appliances may be changed to an optimal operating state in response to the user's delay in returning home.

FIG. 9 is a flowchart of the information processing method for the home appliance according to an embodiment. This embodiment may be an embodiment after the purpose of delaying the user's return home is identified. For example, this may be an information processing method after the user's delayed return home is identified by the information processing method of FIG. 5.

Referring to FIG. 9, the confirmation module 20 may determine the current state of the device by transmitting the first control signal to the first home appliance 1b1 (S31). The first home appliance may transmit an ack message and a status report message (S32). The first home appliance may transmit the ack message and the status report signal to at least one of the confirmation module 20 and the operation determination module 30. Through the bus inside the information processing apparatus, each module of the information processing apparatus may share information. The ack message may be transmitted to the confirmation module. The status report message may be transmitted to the operation determination module.

The confirmation module 20 may determine a current state of the device by transmitting the second control signal to the second home appliance 1b2 (S33). The second home appliance may transmit an ack message and a status report message (S35). The second home appliance may transmit the ack message and the status report signal to at least one of the confirmation module 20 and the operation determination module 30. Through the bus inside the information processing apparatus, each module of the information processing apparatus may share information. The ack message may be transmitted to the confirmation module. The status report message may be transmitted to the operation determination module. The first and second home appliances may be different home appliances. The first and second home appliances may be home appliances that cooperate with each other. For example, the first home appliance 1b1 may be the air purifier, and the second home appliance 1b2 may be the robot vacuum cleaner.

The information processing apparatus for the home appliances according to an embodiment may further include other home appliances other than the third home appliance in addition to the first and second home appliances.

The operation mode determination part 32 may receive two status report messages.

The operation mode determination part 32 may notify at least one of the two status report messages or the operation mode determined by itself to at least one of the operation sequence determination part 31 or the operation time determination part 33 (S34) (S36).

The operation sequence determination part 31 and the operation time determination part 33 may determine an operation sequence and an operation time by referring to at least one of the two status report messages or the determination mode. The operation mode determination part 32 may determine the operation mode of the home appliance by referring to the status report message. Depending on the type of the first and second home appliances and/or the status report message, the operation mode, the operation time, and the operation sequence of the first and second home appliances may be determined differently.

Explanation will be made with an example. It is assumed that both the robot vacuum cleaner and the air purifier have a reservation that ends at 7 o'clock, which is the return home time. In this case, the return home time was delayed to 8 o'clock. In this case, the operation of the operation determination module 30 will be described.

When referring to the roles of the robot vacuum cleaner and the air purifier, the operation sequence determination part 31 may determine that the robot vacuum cleaner is operated with priority over the air purifier. This is because indoor environments are kept cleaner if the air purifier removes fine flying dust caused by the robot vacuum cleaner.

When referring to the roles of the robot vacuum cleaner and the air purifier, the operation mode determination part 32 may operate in a guiding mode in which the robot vacuum cleaner performs final cleaning an area close to where the air purifiers are installed. This is because as much flying dust as possible may be removed by the air purifier after the robot vacuum cleaner stops operating. The air purifier may be determined to operate in turbo mode after operating the robot vacuum cleaner. This is because the air purifier removes more flying dust.

The operation time determination part 33 may determine the operation time of the first and second home appliances according to at least one information of the determined mode and sequence. To this end, at least one of the operation mode determination part 32 or the operation sequence determination part 31 may transmit one's own determination to the operation time determination part 33. The drawing shows notification of an operation sequence as an example. When referring to the mode and sequence of each of the robot vacuum cleaner and the air purifier, the operation time determination part may determine that the air purifier operates immediately at the time when the operation of the robot vacuum cleaner ends. Thus, the flying dust does not settle on the floor and may be filtered by the air purifier as much as possible.

The operation mode determination part 32 may notify the determined mode to the home appliance (S38) (S39). The operation time determination part 33 may notify the determined operation time to the home appliance (S40) (S41). At least one of the operation sequence, the operation mode, or the operation time may be reported to the user through the third result reply.

According to the information processing method for at least two home appliances as described above, it is possible to respond to the user's return home delay regardless of the user's preset. Here, the response to the delay in returning home may be determined by referring to the roles and properties of the at least two home appliances.

For example, in the case of the robot vacuum cleaner and the air purifier, two different aspects may be used: first, the floor cleaning and generation of fine flying dust by the robot cleaner, and second, the removal of fine dust and consumption of filters by the air purifier. Thus, the robot vacuum cleaner may operate first, and the air purifier may operate subsequently.

As another example, in the case of the washing machine and the dryer, the first washing machine performs washing, but has a weak drying function. Second, the dryer may be used mainly after the washing machine is used. Thus, when only the operation of the washing machine is reserved, a preheating operation of the dryer may be performed in advance. Here, an end time of the washing machine and a preheating completion time of the dryer may coincide with the user's return home time. In addition, that a clothes care machine is additionally used after the dryer is turned on may be considered. Through the clothes care machine, the wrinkles may be removed from clothes dried in the dryer.

According to this embodiment, the driving time, the driving mode, and the driving time of at least two home appliances may be changed to an optimal cooperative operation state in response to the user's delay in returning home.

Figure 10:
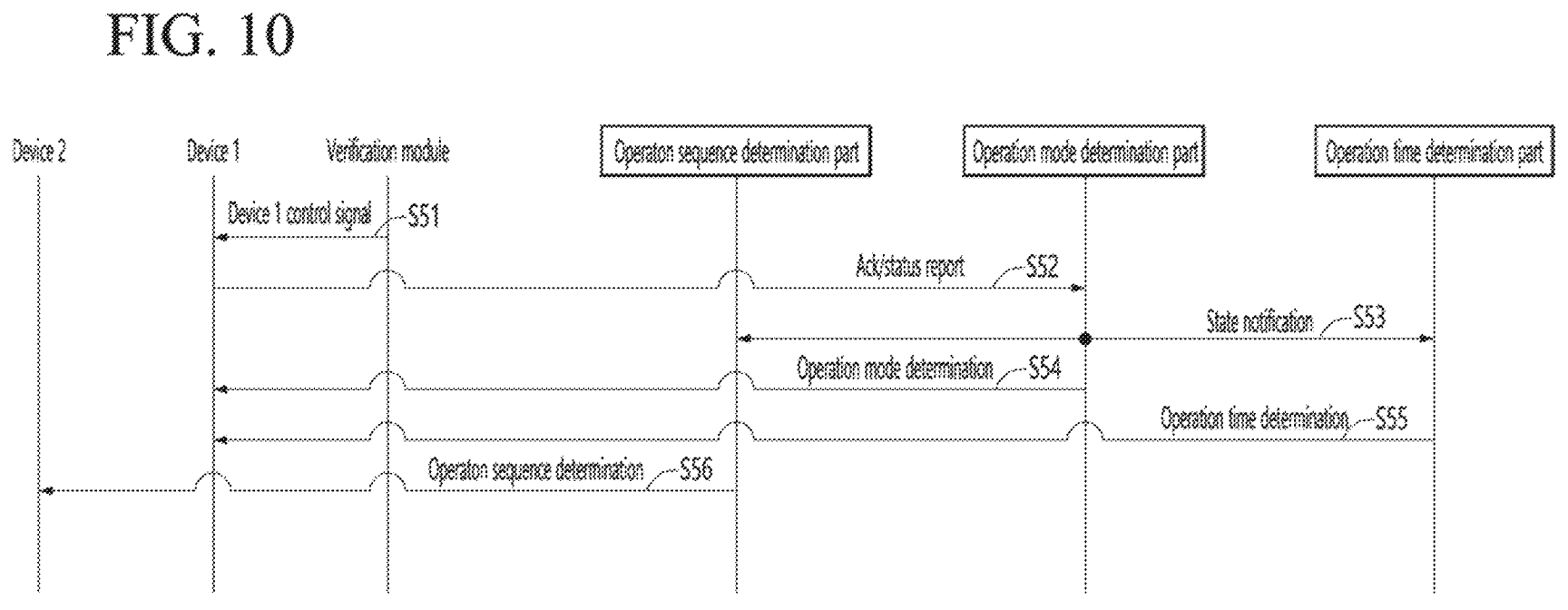

FIG. 10 is a flowchart of the information processing method for the home appliance according to an embodiment. This embodiment may be an embodiment after the purpose of delaying the user's return home is identified. For example, this may be an information processing method after the user's delayed return home is identified by the information processing method of FIG. 5.

Referring to FIG. 10, the confirmation module 20 may determine the current state of the device by transmitting the first control signal to the first home appliance 1*b* (S51). The first home appliance may transmit an ack message and a status report message (S52). The first home appliance may transmit the ack message and/or the status report signal to at least one of the confirmation module 20 and the operation determination module 30. Through the bus inside the information processing apparatus, each module of the information processing apparatus may share information. The ack message may be transmitted to the confirmation module. The status report message may be transmitted to the operation determination module.

The operation mode determination part 32 may receive the status report message. The operation mode determination part may determine the operation mode of the first home appliance by referring to the status report message. Depending on the type of the first home appliance and/or the status report message, the operation mode of the first home appliance may be determined differently. The operation mode determination part 32 may notify the determined mode to the first home appliance (S54).

The mode determined by the operation mode determination part 32 may be notified to at least one of the operation sequence determination part 31 or the operation time determination part 33 (S53). The operation time determination part 33 may determine the operation time of the first home appliance according to the determined mode and notify the determined operation time to the first home appliance (S55). When referring to the determined mode, the operation sequence determination part 31 may select a second home appliance that operates in priority or delay to other appliances. The operation sequence determination part 31 may transmit an operation sequence determination signal to the determined second home appliance (S56).

According to this embodiment, the home appliances that the user has not reserved may be guided to be used if the conditions for cooperation are satisfied.

Explanation will be made with an example. The first home appliance may be an air purifier, and the second home appliance may be a ventilation device. The air purifier is scheduled to operate according to the return home time, and the ventilation device is not scheduled to operate. If the user's return home is delayed, external air may be pleasant. In this case, the operation of the ventilation device may be given priority over the air purifier. These operation results may be reported to the user through the third result reply. In this example, a confirmation message may be transmitted to the user before performing the priority operation of the ventilation device. According to this example, consumption of an air purifier filter may be reduced. According to this example, energy consumption may be reduced.

FIG. 11 is a flowchart of the information processing method for the home appliance according to an embodiment. In this embodiment, the purpose of the user's delay in returning home may be recognized, and the operation determination of the washing machine and dryer may be completed. For example, the information processing method of FIG. 9 may be an information processing method after the operation determination for cooperative driving is completed. Here, when trying to start the operation of the washing machine, it may be determined to use the clothes care machine rather than the drying of the current laundry in the dryer after the dehydration. This is because it is not advisable to use weak fibers such as silk in the dryer.

Referring to FIG. 11, the confirmation module 20 may determine the current state of the appliance by transmitting the first control signal to the home appliance 1*b* (S61). The home appliance may transmit an ack message and a status report message (S62). The home appliance may transmit the ack message and the status report signal to at least one of the confirmation module 20 pr the operation determination module 30. Through the bus inside the information processing apparatus, each module of the information processing apparatus may share information. The ack message may be transmitted to the confirmation module. The status report message may be transmitted to the operation determination module. The embodiment shows that the confirmation module 20 transmits the status report message to the operation determination module 30.

The operation mode determination part 32 may receive the status report message. The operation mode determination part may determine the operation mode of the home appliance by referring to the status report message. Depending on the type of the home appliance and/or the status report message, the operation mode of the home appliance may be determined differently. The operation mode determination part 32 may notify the determined mode to the home appliance (S64). Here, the home appliance may assume a preparation state for proceeding with the determined mode. The operation mode determination part 32 may transmit the determined mode to the terminal (S65). The user may receive recommendations for the home appliances using the terminal. The user may transmit a message confirming that the determined mode is being performed (S66). The operation mode determination part 32 may perform the operation mode of the home appliance according to the recommendation (S67).

Explanation will be made with an example. It is assumed that the home appliance is the clothes care machine. In this case, the confirmation module 20 may confirm the status of the clothes care machine. If the clothes care machine may operate, the operation mode determination part determines the operation mode of the clothes care machine and notifies the operation mode. After obtaining the user's confirmation, the operation mode of the clothes care machine may be executed.

Figure 12:
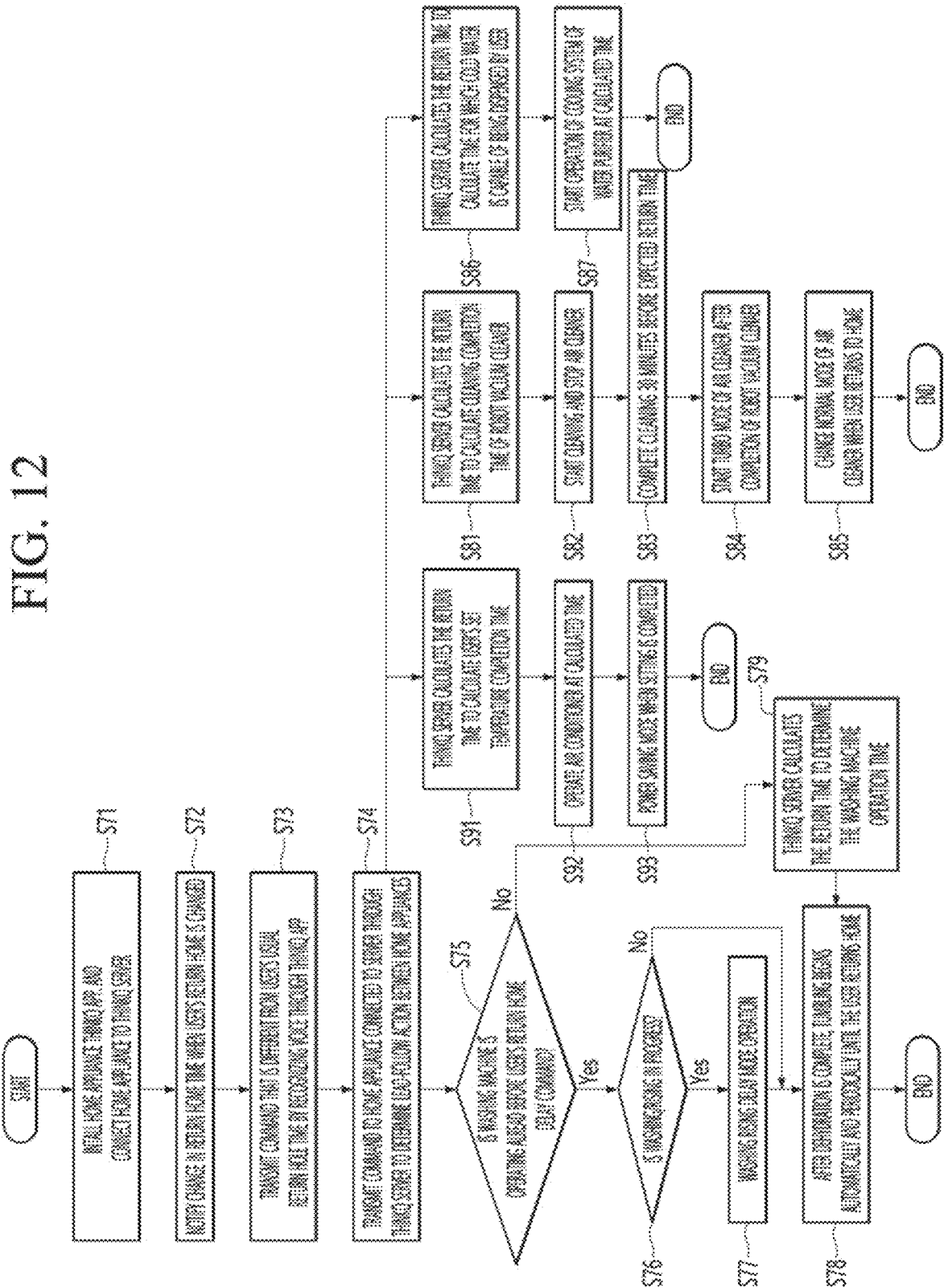
FIG. 12 is a flowchart of the information processing method for the home appliance according to an embodiment.

FIG. 12 is a flowchart of the information processing method for the home appliance according to an embodiment. In this embodiment, a view for explaining an information processing method for a plurality of home appliances is illustrated.

Referring to FIG. 12, an application program is installed on the user's home appliance, and the home appliance may be connected to a server through a network (S71). As an example, the application may be a ThinQ app. The application program may be installed by the server 2c.

In this state, if the user's return home time changes differently from usual, the change in return home time is notified (S72). The normal return home time may be known through an average of the time when the user's terminal is connected to the Wi-Fi network used by the home appliance, and an average of the time the user is in the same location as the home appliance based on LBS. The change in return home time may be automatically notified when the user does not return home even at the usual return home time. Here, a confirmation message may be transmitted to the user. The change in return home time may be performed by the user informing the server by a voice or message through the terminal. For example, you may use voice information such as "I won't be home until 2 hours from now, so put it in delay mode."

The application may notify the server of a change in return home (S73). The server may transmit predetermined control commands for the home appliances. The server may determine the leading and following operations of at least two home appliances (S74). At least two home appliances may operate according to the control command.

The washing machine may operate in the following information processing method according to the control command.

First, it is possible to determine whether the washing machine is already operating (S75). If the washing machine is not operating in the washing machine operation detection process (S75), the operating time of the washing machine may be delayed by delaying the return home time by recalculating the time (S79). If the user returns to home during the delay operation process (S79), the washing process may be started immediately.

If the washing machine is operating in the washing machine operation detection process (S75), it is further determined whether it is in the washing or rinsing cycle (S76). If it is a washing or rinsing cycle in the washing cycle determination process (S76), the washing and rinsing cycle may operation to be delayed (S77). For example, to improve washing performance, the washing machine may operate on a gentler wash cycle for a longer period of time. For example, the rinsing time may be lengthened to improve rinsing performance. When the delay operation process (S77) is ended, the washing machine may perform periodic tumbling to prevent wrinkles and bad smells in the laundry (S78).

If it is not a washing and rinsing cycle in the washing cycle determination process (S76), the periodic tumbling process (S78) may be performed immediately after dehydration is completed. Even after performing the delay operation process (S79), the user does not return to home, and thus, the laundry cloth may be left there. Here, the tumbling process (S78) may be performed.

According to the above information processing method, it is possible to prevent the wrinkles in laundry cloths and the generation of the bad smells.

The robot vacuum cleaner and the air purifier may operate in the following information processing methods according to the above control commands.

First, the cleaning completion time of the robot vacuum cleaner may be found by recalculating the user's return home time (S81). Thereafter, when the robot vacuum cleaner's start time comes, cleaning may begin. Here, the operation of the air purifier may be stopped (S82). The ventilation system may start while the air purifier is stopped. After the robot vacuum cleaner continues to operate and cleaning is completed (S83), the air purifier may start operating (S84). Here, since there is a lot of flying dust from the robot vacuum cleaner in the air, the air purifier may operate in turbo mode.

When the user returns to home, or reaches the return home time after the delay, the air purifier may change to normal mode to operate (S85).

According to the above information processing method, the filter lifespan of the air purifier may be extended.

The water purifier may operate in the following information processing method according to the above control command.

First, the user's return home time may be calculated backwards to calculate the time when cold water may be dispensed at the return home time (S86). Here, the time when cold water may be discharged may be the user's return home time. The operating time of the cooling system required for purified water to reach a cold water temperature for dispensing may be known in advance. In the delayed return home, the cooling system may operate at a time preceding the cooling system operation time (S87).

According to the above information processing method, energy required for the operation of the water purifier may be saved.

The air conditioner may operate in the following information processing method according to the above control command.

First, the user's return home time may be calculated backwards to obtain the target time at which the desired indoor temperature has to be achieved (S91). The air conditioner may operate at a time preceding the target time (S92). Here, the preceding time may vary depending on the efficiency and operation mode of the air conditioning system. Thereafter, when the desired indoor temperature is reached, the air conditioner may operate in power saving mode (S93).

According to the above information processing method, a heat loss may be reduced, and energy waste may be prevented.

INDUSTRIAL APPLICABILITY

According to the present invention, it is possible to activate the consumption of the remote control function of the home appliances.

The invention claimed is:

1. An information processing system, comprising:

at least one home appliance;

a terminal configured to process information of the at least one home appliance;

an individual service area configured to provide an individual service;

an application service area configured to provide an application service to a user by applying the individual service supplied from the individual service area;

a first server configured to communicate with the at least one home appliance, the first server included in the application service area;

a second server configured to communicate with the terminal, the second server included in the application service area, wherein the first and second servers communicate with each other; and an information processing apparatus connected to the terminal and the at least one home appliance through a network and configured to provide an application service using the individual service, wherein the information processing apparatus is configured to:

receive basic information on changes of a schedule of the user by using the second server of the application service area;

confirm the user's schedule information from the basic information by using the individual service;

confirm a first state of the at least one home appliance, which is a current state of the at least one home appliance by using the first server of the application service area; and change the at least one home appliance from the first state into a second state in response to the user's schedule information by using the first server of the application service area.

2. The information processing system according to claim 1, wherein the basic information is input from the terminal by the user.

3. The information processing system according to claim 1, wherein the basic information is information related to a delay in the user returning to the at least one home appliance, wherein the first state includes information on an operation of the at least one home appliance, and wherein the second state includes reservation information of the at least one home appliance to be changed in response to the user's schedule information.

4. The information processing system according to claim 1, wherein the information processing apparatus is further configured to transmit the user's schedule information to the terminal.

5. The information processing system according to claim 1, wherein, in the information processing apparatus, at least one of a status of the first state of the at least one home appliance or a status of the second state of the at least one home appliance is transmitted to the terminal.

6. An information processing apparatus, comprising:

a confirmation module configured to check an operation state of at least one home appliance in response to a node request; and an operation determination module configured to change the operation state of the at least one home appliance from a first state to a second state when there is a trigger signal containing a user's schedule information, wherein the user's schedule information contains information related to a delay of the user in returning to the at least one home appliance, wherein the operation determination module comprises an operation sequence determination part, an operation mode determination part, and an operation time determination part, wherein the operation sequence determination part is configured to determine that a first home appliance of the at least one home appliance operates before a second home appliance of the at least one home appliance, wherein the operation mode determination part is configured to determine an operation in a delay mode in which an operation of the at least one home appliance is delayed based on the user's schedule information, and wherein the operation time determination part is configured to change an operation time of the at least one home appliance based on the user's schedule information.

7. An information processing method, comprising:

receiving a trigger signal from a terminal through an information processing apparatus by using a second server of an application service area;

determining, by an individual service, a meaning of the trigger signal, the individual service being provided by an individual service area different from the application service area, wherein the individual service area includes the terminal;

identifying a first state of at least one home appliance through the information processing apparatus by using a first server of the application service area, wherein the first server is configured to communicate with the at least one home appliance, and wherein the application service area is configured to provide an application service to the terminal by applying the individual service supplied from the individual service area; and by using the first server, performing an application service that changes a state of the at least one home appliance from the first state to a second state in response to the meaning of the trigger signal determined by the individual service.

8. The information processing method according to claim 7, further comprising performing at least one of:

notifying, by the information processing apparatus to the terminal, the meaning of the trigger signal as a first result reply; or notifying, by the information processing apparatus to the terminal, the first state of the at least one home appliance as a second result reply; or notifying, by the information processing apparatus to the terminal, the second state of the at least one home appliance as a third result reply.

9. The information processing method according to claim 7, wherein the trigger signal is a change in a user's schedule, wherein the first state is a current operation state of the at least one home appliance, and wherein the second state is a change in operation state of the at least one home appliance in response to the change in the user's schedule.

10. The information processing method according to claim 9, wherein the change in the user's schedule is that the user is delayed in returning to the at least one home appliance, and wherein the second state is in an operation state that that at least one home appliance operates with a delay.

11. The information processing method according to claim 7, wherein, in the performing the application service that changes the state of the at least one home appliance from the first state to the second state, the second state comprises determining that an operation of a first home appliance of the at least one home appliance is performed prior to an operation of a second home appliance of the at least one home appliance.

12. The information processing method according to claim 11, wherein the first home appliance comprises a robot vacuum cleaner, and the second home appliance comprises an air purifier.

13. The information processing method according to claim 11, wherein the first state is a state in which an operation reservation is set.

14. The information processing method according to claim 7, wherein, in the performing the application service that changes the state of the at least one home appliance from the first state to the second state, the first state is a state in which an operation reservation is not set, and the second state is a state in which the operation reservation is set.

15. The information processing method according to claim 14, wherein the at least one home appliance that is changed from the first state to the second state comprises a ventilation device.

16. The information processing method according to claim 7, wherein the meaning of the trigger signal is a delay in returning to the at least one appliance by a user, wherein the at least one home appliance comprises a washing machine, and the first state is a current state of the washing machine, wherein, when the first state is a reservation operation, an operation of the washing machine is delayed in response to the delay in returning to the at least one appliance by the user;

wherein, when the first state is a washing or rinsing operation, the second state is a delayed operation of the washing machine, and wherein, when the first state is a dehydration operation, tumbling is performed after the dehydration operation is completed.

17. The information processing method according to claim 7, wherein, in the performing the application service that changes the state of the at least one home appliance from the first state to the second state, the first state is a state in which an operation reservation is not set, and wherein the information processing method further comprises:

recommending a user input into the terminal a desired operation of the at least one home appliance, and performing of the desired operation by the at least one home appliance.

*     *     *     *     *